(12) United States Patent
Yoshida et al.

(10) Patent No.: US 7,492,679 B2
(45) Date of Patent: Feb. 17, 2009

(54) WRITE ONCE-TYPE RECORDING MEDIUM, AND RECORDING APPARATUS AND RECORDING METHOD

(75) Inventors: Masayoshi Yoshida, Tokorozawa (JP); Takeshi Koda, Tokorozawa (JP); Keiji Katata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 695 days.

(21) Appl. No.: 10/547,195

(22) PCT Filed: Feb. 27, 2004

(86) PCT No.: PCT/JP2004/002394

§ 371 (c)(1),
(2), (4) Date: Aug. 29, 2005

(87) PCT Pub. No.: WO2004/077433

PCT Pub. Date: Sep. 10, 2004

(65) Prior Publication Data

US 2006/0156056 A1    Jul. 13, 2006

(30) Foreign Application Priority Data

Feb. 28, 2003  (JP) .............................. 2003-054989

(51) Int. Cl.
*G11B 15/52*  (2006.01)
(52) U.S. Cl. .................................. 369/47.14; 369/275.3
(58) Field of Classification Search ...................... None
See application file for complete search history.

(56) References Cited

FOREIGN PATENT DOCUMENTS

| | | |
|---|---|---|
| JP | 63-282967 | 11/1988 |
| JP | 02-236865 | 9/1990 |
| JP | 2002-329321 | 11/2002 |

*Primary Examiner*—Paul Huber
(74) *Attorney, Agent, or Firm*—Young & Thompson

(57) ABSTRACT

A spare area 12 is divided into partial spare areas 12A to 12D, and a defect list 15 is divided into partial defect lists 15A to 15D, with the partial spare areas 12A to 12D corresponding to the partial defect lists 15A to 15D, respectively. When a defect is detected, only the partial defect list updated by the detection is recorded into the defect management area of a recording medium 10.

15 Claims, 17 Drawing Sheets

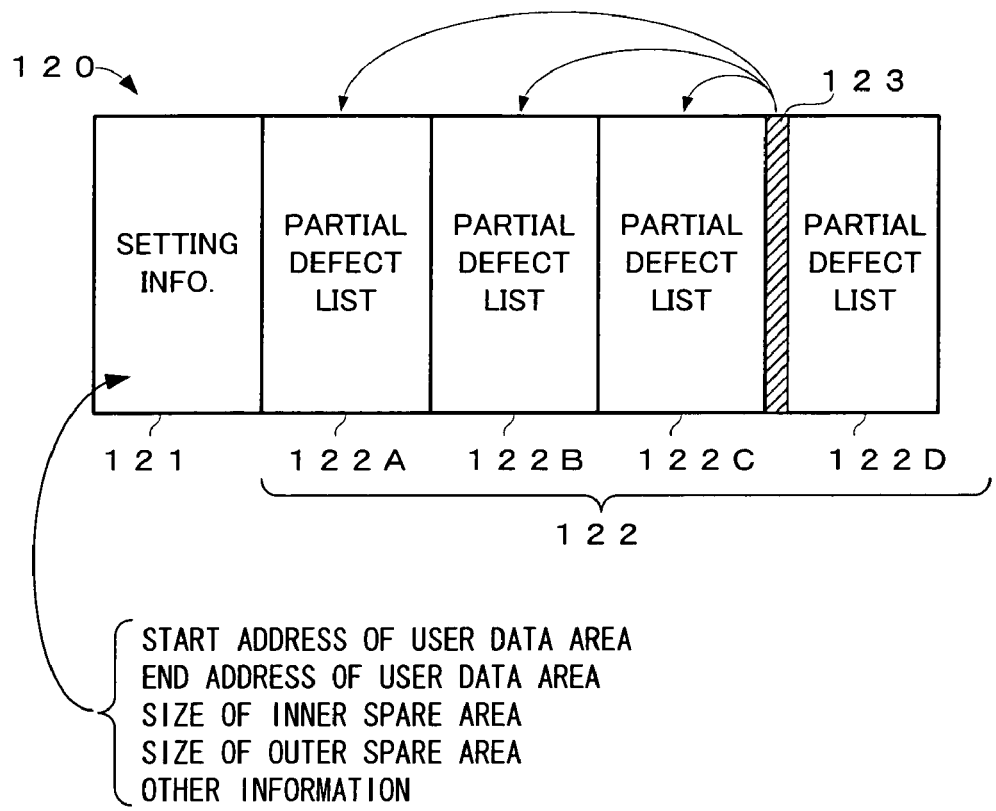

WRITE ONCE-TYPE RECORDING MEDIUM, AND RECORDING APPARATUS AND RECORDING METHOD

This application is a 371 of PCT/JP04/02394, filed Feb. 27, 2004.

TECHNICAL FIELD

The present invention relates to a write-once-type recording medium, and a recording apparatus for and a recording method of recording record data onto the write-once-type recording medium.

BACKGROUND ART

As a technique of improving the reliability of the recording and reading of record data on a high-density recording medium, such as an optical disk, a magnetic disk, and a magneto optical disk, there is defect management. Namely, when there are scratches or dusts, or deterioration (which are collectively referred to as a "defect") on the recording medium, data to be recorded or already recorded at the position of the defect is recorded in another area on the recording medium (which is referred to as a "spare area"). As described above, by evacuating to the spare area the record data which is possibly imperfectly recorded or read because of the defect, it is possible to improve the reliability of the recording and reading of the record data (refer to Japanese Patent Application Laying Open NO. Hei 11-185390).

In general, a defect list is made to perform the defect management. On the defect list, there are recorded address information for indicating the position of a defect on the recording medium, and address information for indicating a position in the spare area (e.g. a recording position in the spare area) to which the data to be recorded or already recorded at the position of the defect is evacuated.

In general, the defect list is made when a recording medium is initialized or formatted. It is also made when the record data is recorded onto the recording medium and the position of the defect is found by verifying the record data, or the like. When the record data is recorded and rewritten several times, the defect list is made or updated every time the record data is recorded and rewritten.

When the record data is recorded onto the recording medium, the defect list is referred to. This allows the recording of the record data onto the recording medium away from the position of a defect. On the other hand, the defect list is also referred to when the record data recorded on the recording medium is reproduced or read. This makes it possible to surely read both the record data recorded in a normal recording area and the record data recorded in the spare area because of the presence of a defect, on the basis of the defect list.

The defect list is generally recorded in a specific area on the recording medium, which is the object of the making or updating of the defect list. The defect list is read from the recording medium when the record data recorded on the recording medium is reproduced or when other record data is rewritten or additionally recorded. Then the defect list is referred to in a recording operation by a recording apparatus or in a reproduction operation by a reproducing apparatus.

DISCLOSURE OF INVENTION

The defect list is recorded in a specific area on the recording medium. For example, with respect to a rewritable-type optical disk using a blue laser, the defect list is recorded in a predetermined area (which is hereinafter referred to as a "defect management area") reserved in a lead-in area or lead-out area on the disk.

As described above, the defect list is updated when the record data is recorded and rewritten and the position of the defect is found, or the like. Then, the defect list is overwritten in the defect management area on the recording medium which is the object of the recording and rewriting, every time the defect list is updated by the recording and rewriting of record data. Namely, the defect list in the defect management area is rewritten every time the defect list is updated.

Such updating of the defect list by rewriting it can be realized only in case that the recording medium is rewritable-type. In case that the recording medium is a so-called "write-once-type recording medium", for example, a write-once-type optical disk, it is necessary to use another method to realize the updating of the defect list. For example, a conceivable method as the method of realizing the updating of the defect list is such that every time the defect list is updated, the updated defect list is recorded in a new unrecorded or blank area on the write-once-type recording medium.

According to this method, however, every time the defect list is updated, it is necessary to reserve an area to record the updated defect list. It is also necessary to estimate the number of times the defect list is updated and to reserve the defect management area large enough to record the defect list by the number of times. In any case, in order to realize the updating of the defect list on the write-once-type recording medium, it is necessary to reserve a larger area to record the defect list (i.e., the larger defect management area), as compared with the case where the defect list can be rewritten or overwritten.

As a result, the data structure of the write-once-type recording medium is different from that of the rewritable-type recording medium, which causes the problem that they are mutually incompatible regarding the reading of data recorded on the recording media. For example, enlarging the defect management area in the lead-in area extends the lead-in area, which causes different extent (size or length) of the lead-in areas between the write-once-type recording medium and the rewritable-type recording medium. Consequently, both recording media become incompatible, which possibly causes the problem that a drive apparatus for the existing rewritable-type recording medium cannot reproduce the data on the write-once-type recording medium.

Moreover, if the defect management area is reserved to be large, an area on a recording surface where the record data is supposed to be recorded becomes small by that much, which causes a problem of decreasing a recording capacity for the record data.

It is therefore a first object of the present invention to provide: a write-once-type recording medium which has a defect management function and which is compatible with a rewritable-type recording medium; and a recording apparatus for and a recording method of recording the record data onto the write-once-type recording medium.

A second object of the present invention is to provide: the write-once-type recording medium which allows the decrease of the defect management area and which allows the increase of a recording capacity for the record data while increasing the reliability of an operation for recording and/or reading the record data; and the recording apparatus for and the recording method of recording the record data onto the write-once-type recording medium.

The above object of the present invention can be achieved by a write-once-type recording medium provided with: a data area in which record data is recorded; a spare area in which the record data to be recorded or already recorded at a position of a defect in the data area is recorded; and a defect management area in which defect management information including a defect list is recorded. The defect list indicates (i) the position of the defect in the data area and (ii) a position in the spare area at which the record data to be recorded or already recorded at the position of the defect is recorded. The defect list is divided into a plurality of partial defect lists. Index information able to be an index for specifying a partial defect list among the partial defect lists which carries newest information is appended to at least one of the partial defect lists.

The above object of the present invention can be also achieved by a first recording apparatus for recording record data onto a write-once-type recording medium provided with: (I) a data area in which the record data is recorded; (II) a spare area in which the record data to be recorded or already recorded at a position of a defect in the data area is recorded; and (III) a defect management area in which defect management information including a defect list is recorded. The defect list indicates (i) the position of the defect in the data area and (ii) a position in the spare area at which the record data to be recorded or already recorded at the position of the defect is recorded. The defect list is divided into a plurality of partial defect lists. The recording apparatus is provided with: a first recording device for recording the record data into the data area; a memory device for storing therein the defect management information; a defect-detecting device for detecting a defect in the data area; a second recording device for recording the record data to be recorded at the position in the data area of the defect detected by the defect-detecting device, into the spare area; a list-updating device for updating the partial defect list by recording, onto the partial defect list, information for indicating (i) the position of the defect detected by the defect-detecting device and (ii) the position in the spare area at which the record data to be recorded at the position of the defect is recorded; and a third recording device for (i) selecting the partial defect list updated by the list-updating device from among the plurality of partial defect lists included in the defect management information stored in the memory device and (ii) recording the selected partial defect list into the defect management area.

The above object of the present invention can be also achieved by a second recording apparatus for recording record data onto a write-once-type recording medium provided with: (I) a data area in which the record data is recorded; (II) a spare area in which the record data to be recorded or already recorded at a position of a defect in the data area is recorded; (III) a temporary defect management area in which defect management information including a defect list is temporarily recorded, the defect list indicating (i) the position of the defect in the data area and (ii) a position in the spare area at which the record data to be recorded or already recorded at the position of the defect is recorded; and (IV) a definite defect management area in which the defect management information is definitely recorded, the defect list being divided into a plurality of partial defect lists. The recording apparatus is provided with: a first recording device for recording the record data into the data area; a memory device for storing therein the defect management information; a defect-detecting device for detecting a defect in the data area; a second recording device for recording the record data to be recorded at the position in the data area of the defect detected by the defect-detecting device, into the spare area; a list-updating device for updating the partial defect list by recording, onto the partial defect list, information for indicating (i) the position of the defect detected by the defect-detecting device and (ii) the position in the spare area at which the record data to be recorded at the position of the defect is recorded; and a third recording device for (i) selecting the partial defect list updated by the list-updating device from among the plurality of partial defect lists included in the defect management information stored in the memory device and (ii) recording the selected partial defect list into the temporary defect management area.

The above object of the present invention can be also achieved by a first computer program of instructions for tangibly embodying a program of instructions executable by a computer to make the computer function as the above-described first recording apparatus of the present invention (including its various aspects).

The above object of the present invention can be also achieved by a second computer program of instructions for tangibly embodying a program of instructions executable by a computer to make the computer function as the above-described second recording apparatus of the present invention (including its various aspects).

The above object of the present invention can be also achieved by a first computer program product in a computer-readable medium for tangibly embodying a program of instructions executable by a computer to make the computer function as the above-described first recording apparatus of the present invention (including its various aspects).

The above object of the present invention can be also achieved by a second computer program product in a computer-readable medium for tangibly embodying a program of instructions executable by a computer to make the computer function as the above-described second recording apparatus of the present invention (including its various aspects).

According to the first or second computer program product of the present invention, the first or second recording apparatus of the present invention described above can be embodied relatively readily, by loading the computer program product from a recording medium for storing the computer program product, such as a ROM, a CD-ROM, a DVD-ROM, a hard disk or the like, into the computer, or by downloading the computer program product, which may be a carrier wave, into the computer via a communication device. More specifically, the first or second computer program product may be provided with computer readable codes (or computer readable commands) to make the computer to function as the first or second recording apparatus of the present invention described above.

The above object of the present invention can be also achieved by a recording method of recording record data on a write-once-type recording medium provided with: (I) a data area in which the record data is recorded; (II) a spare area in which the record data to be recorded or already recorded at a position of a defect in the data area is recorded; and (III) a defect management area in which defect management information including a defect list is recorded, the defect list indicating (i) the position of the defect in the data area and (ii) a position in the spare area at which the record data to be recorded or already recorded at the position of the defect is recorded, the defect list being divided into a plurality of partial defect lists. The recording method is provided with: a memory process of storing the defect management information; a first recording process of recording the record data into the data area; a defect-detecting process of detecting a defect in the data area; a second recording process of recording the record data to be recorded at the position in the data area of the defect detected by the defect-detecting process, into the spare area; a list-updating process of updating the partial defect list by recording, onto the partial defect list, information for indicating (i) the position of the defect detected by the defect-detecting process and (ii) the position in the spare area at which the record data to be recorded at the position of the defect is recorded; and a third recording process of (i) selecting the partial defect list updated by the list-updating process from among the plurality of partial defect lists included in the defect management information stored in the memory process and (ii) recording the selected partial defect list into the defect management area.

These functions and other advantages of the present invention will be apparent from the following descriptions of embodiments and examples.

BRIEF DESCRIPTION OF DRAWINGS

FIG. 12 is an explanatory diagram showing a defect list in the example;

FIG. 13 is an explanatory diagram showing one example of the content of the partial defect list in the example;

BEST MODE FOR CARRYING OUT THE INVENTION

The embodiments of the present invention will be explained with reference to the drawings hereinafter.

First Embodiment of Write-Once-Type Recording Medium

A first embodiment of the write-once-type recording medium of the present invention will be explained with reference to the drawings. Incidentally, the drawings used for the explanation of the embodiments of the present invention embody constitutional elements or the like of the recording medium or recording apparatus of the present invention only for the purpose of explaining technical ideas thereof. The shape, size, position, connection relationship, and the like of various constitutional elements or the like are not limited to the drawings.

Figure 1:
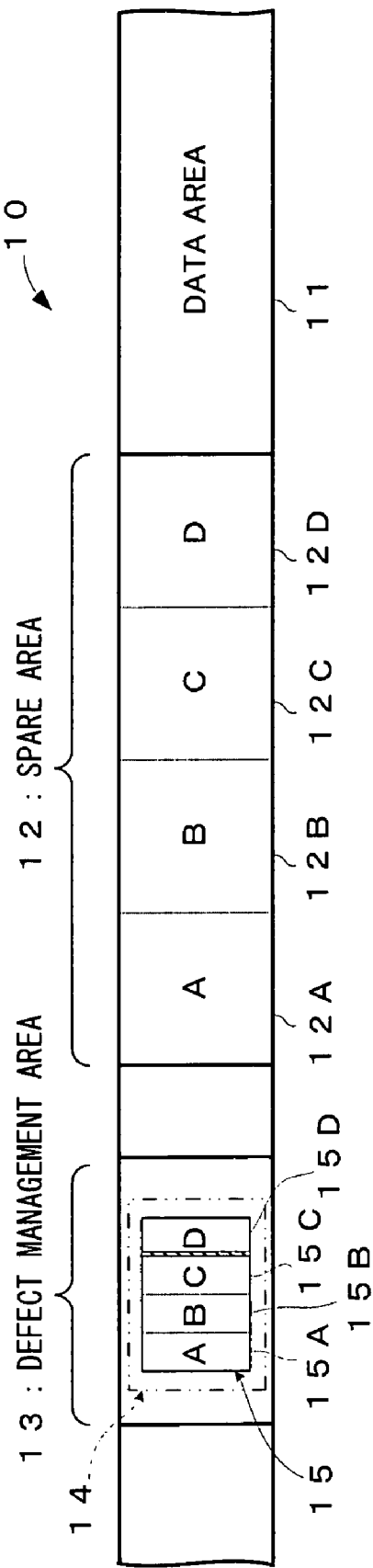
FIG. 1 is an explanatory diagram showing a first embodiment of a write-once-type recording medium of the present invention.

FIG. 1 shows the recording structure in the first embodiment of the write-once-type recording medium of the present invention. The write-once-type recording medium 10 shown in FIG. 1 is, for example, an optical disk, a magnetic disk, a magneto optical disk, a dielectric recording disk, or the like. It is not limited to a disk-shaped recording medium, and it may be a card-shaped recording medium. The recording medium 10 is a write-once-type recording medium which allows the recording of record data only once at each position, e.g. a write once recording disk.

As shown in FIG. 1, the recording medium 10 is provided with: a data area 11; a spare area 12; and a defect management area 13.

The data area 11 is intended to record or write-once therein the "record data". The record data is data which is the object of reproduction or execution, e.g. image data; audio data; text data; contents data; a computer program; or the like.

The spare area 12 is intended to record therein the record data to be recorded or already recorded at the position of a defect in the data area 11.

The spare area 12 is divided into a plurality of partial spare areas. FIG. 1 shows an example in which the spare area 12 is divided into four spare areas 12A, 12B, 12C, and 12D. Incidentally, the division of the spare area 12 means conceptual division and does not necessarily mean the physical or actual division of the area. For example, the spare area which exists as one continuous area on the recording surface of the recording medium 10 can be conceptually divided into a plurality of partial spare areas. If there area a plurality of spare areas placed at a plurality of points on the recording surface of the recording medium 10 with them separated from each other (e.g. if there are the spare areas individually placed on the inner and outer circumferential sides of a disc), each of the plurality of spare areas distributedly placed may be treated as the partial spare area. It is also possible to further divide each of the plurality of spare areas distributedly placed and to regard the divided individual areas as the partial spare areas.

The defect management area 13 is an area in which the defect management information 14 including a defect list 15 is recorded. The defect list 15 indicates the position of a defect in the data area 11 and the position in the spare area 12 of the record data to be recorded or already recorded at the position of the defect.

The defect list 15 is divided into a plurality of partial defect lists, which correspond to the plurality of partial spare areas. For example, the number of the partial defect lists is equal to the number of the partial spare areas. The size of each partial defect list is determined by the relationship with the size of the corresponding spare area. For example, if the size of the partial spare area is large, much record data will be recorded in the partial spare area, so that information which is recorded on the partial defect list corresponding to the partial spare area will be much. Thus, the size of the partial defect list becomes large. In the example in FIG. 1, the defect list 15 is divided into four defect lists 15A, 15B, 15C, and 15D, which correspond to the partial spare areas 12A, 12B, 12C, and 12D, respectively.

Figure 2:
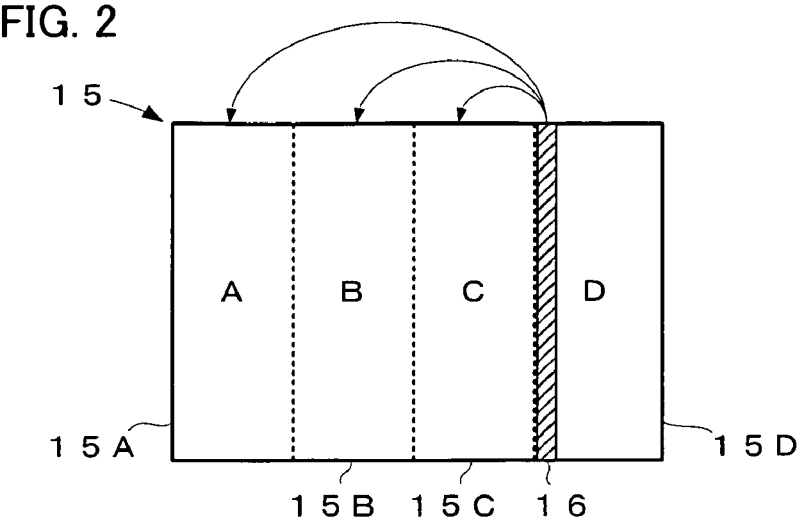
FIG. 2 is an explanatory diagram showing partial defect lists and index information in the first embodiment.

Moreover, index information which can be an index for specifying the partial defect lists carrying the newest information is appended to at least one of the plurality of partial defect lists. FIG. 2 shows an example in which the index information is appended to the partial defect list 15D placed at the end. Index information 16 in FIG. 2 is an index to specify the rest of the partial defect lists 15A to 15C carrying the newest information except the partial defect list 15D. For example, if identifiers are individually appended to the partial defect lists 15A to 15C, the identifiers may be appended to the partial defect list 15D as the index information 16. The index information 16 is not limited to the identifier, but may be address information for indicating each partial defect list and may be other unique information which can specify each partial defect list. The index information 16 may include information for specifying its own partial defect list carrying the newest information (which is the partial defect list 15D in FIG. 2).

Specific examples of the use of each area on the write-once-type recording medium 10 in FIG. 1 and the generation or updating of the defect management information 14 will be hereinafter explained.

When the recording medium 10 is initialized or formatted by a recording apparatus, the position and size of the data area 11, the spare area 12, and the defect management area 13 are individually determined. In some cases, all or any one of the areas are pre-formatted. The defect management information 14 is made upon the initializing or formatting. Specifically, the defect list 15 which is divided into the partial defect lists 15A to 15D is made so as to correspond to the partial spare areas 12A to 12D. At this time, in order to facilitate the specification of each partial defect list, the identifier is preferably appended to each of the partial defect lists 15A to 15D. The index information 16 is appended to the partial defect list 15D. The defect management information 14 is made or generated in a memory device (e.g. a memory) in the recording apparatus. The made defect management information 14 is read from the memory and recorded by the recording apparatus into the defect management area 13 on the recording medium 10. FIG. 1 shows this state.

Next, when the record data is recorded by the recording apparatus onto the recording medium 10, a preparation for recording is firstly performed by the recording apparatus. Firstly, the defect management information 14 recorded in the defect management area 13 on the recording medium 10 is read by the recording apparatus and stored into the memory in the recording apparatus. When the record data is recorded following the completion of the initializing or formatting, the reading operation described above is not performed because there is the defect management information 14 in the memory. After the preparation for recording is completed, the record data is recorded onto the recording medium 10. The record data is verified upon recording it. When the imperfection in recording of the record data is clarified by the result of the verifying, it is estimated that there is a defect at a position where the record data is supposed to be recorded. As described above, when a defect is detected on the basis of the result of the verifying, the record data is recorded into the spare area 12. At this time, if the size of the record data to be recorded is smaller than that of one partial spare area, the record data is recorded into the one partial spare area. Now, suppose that the record data is recorded in the partial spare area 12A, for example.

When the record data is recorded in the partial spare area 12A, the position of the defect (e.g. the address information) and the position in the partial spare area 12A at which the record data is recorded (e.g. the address information) are obtained, and they are recorded onto the partial defect list 15A corresponding to the partial spare area 12A. This causes the updating of the partial defect list 15A stored in the memory of the recording apparatus.

After one series of recording of the record data is completed, only the updated partial defect list 15A is read out of the partial defect lists 15A to 15D stored in the memory of the recording apparatus, and this list is recorded or written-once into the defect management area 13 on the recording medium 10. Incidentally, the partial defect lists 15B to 15D are not updated yet, so they are not recorded or written-once into the defect management area on the recording medium 10.

Before the partial defect list 15A is recorded into the defect management area 13 on the recording medium 10, the index information 16 is appended to the partial defect list 15A. This index information 16 indicates the identifiers appended to the partial defect lists 15B, 15C, and 15D. When the partial defect list 15A is recorded into the defect management area 13, this index information 16 is also recorded together.

Figure 3:
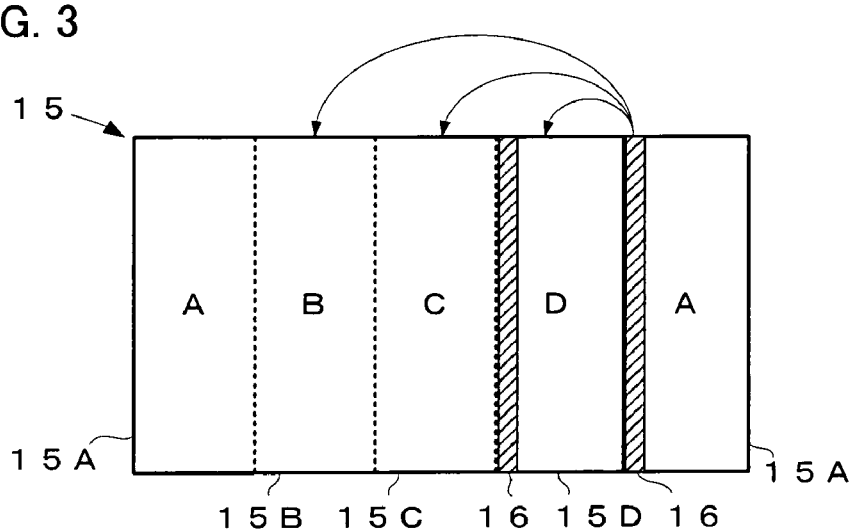
FIG. 3 is an explanatory diagram showing a state in a defect management area in the first embodiment.

FIG. 3 shows a state in the defect management area 13 in which the partial defect list 15A and the index information 16 are recorded. Since the recording medium 10 is write-once-type but not rewritable-type, it is not possible to overwrite information thereon. Thus, the partial defect list 15A is recorded in a row sequentially in an unrecorded area (i.e. an empty area) next to the partial defect list 15D recorded at the end, at the previous time.

Later, when the recording of the record data is again performed to the recording medium 10, the recording medium 10 is inserted or loaded into the recording apparatus, and a preparation for recording is conducted by the recording apparatus. Firstly, the index information 16 appended to the partial defect list 15A placed at the end, i.e. the index information 16 appended to the partial defect list 15A placed on the right side of FIG. 3, is recognized. Then, the recording positions of the partial defect lists 15B, 15C, and 15D indicated by the index information 16 are identified. Then, the partial defect list 15A, which is placed at the end, and the partial defect lists 15B, 15C, and 15D are read from the defect management area 13 and are stored into the memory of the recording apparatus. After the recording preparation is completed, the record data is recorded. When a new defect is detected during the recording, the record data to be recorded at the position of the defect is recorded into any one of the partial spare areas. For example, if the record data is recorded into the partial spare area 12B, new address information is recorded onto the partial defect list 15B corresponding to the partial spare area 12B in the memory of the recording apparatus. This causes the updating of the partial defect list 15B. After the recording is completed, only the updated partial defect list 15B is read from the memory of the recording apparatus, and the index information 16 is appended to this list. Then, the partial defect list 15B and the index information 16 are recorded into the defect management area 13 on the recording apparatus 10. As a result, the defect management area 13 on the recording medium 10 becomes in the state shown in FIG. 4.

As described above, according to the recording medium 10 in the embodiment, the spare area 12 is divided into the partial spare areas 12A to 12D, and the defect list 15 is divided into the partial defect lists 15A to 15D, with the partial spare areas 12A to 12D corresponding to the partial defect lists 15A to 15D, respectively. Thus, when a defect is detected, all needed is to record only the partial defect list corresponding to the partial spare area in which new record data is recorded as a result of the detection (i.e. the updated partial defect list) on the recording medium 10. Namely, when a defect is detected and the defect list 15 is updated, it is not necessary to record the updated defect list 15 as a whole onto the recording medium 10. Therefore, it is possible to reduce the amount of information recorded onto the recording medium 10 by the updating of the defect management information 14. As a result, it is possible to reduce the defect management area 13 to be reserved on the recording medium 10. Thus, it is possible to reserve the data area 11 to be large while realizing the defect management on the write-once-type recording medium 10, which increases a recording capacity for the record data.

According to the write-once-type recording medium 10 in the embodiment, it is possible to reduce the defect management area 13 to be reserved on the recording medium 10. Thus, it is possible to place the defect management area 13 in the lead-in area on the recording medium 10 without extending the lead-in area. Namely, in the case of a rewritable-type recording medium, the defect management area is generally placed in the lead-in area, and the defect management information is updated by rewriting the defect management information recorded in the defect management area. With respect to the size of the defect management area, since the defect management information can be rewritten or over-written, it is enough if one defect list fits in the defect management area. As opposed to this, in the case of a write-once-type recording medium, it is necessary to record the defect management information in an unrecorded area (i.e. an empty area) in order to realize the updating of the defect management information. As a result, it is necessary to reserve the defect management area to be large in preparation for the updating. Consequently, there is no choice but to extend the lead-in area in order to reserve the defect management area to be large in the lead-in area. According to the write-once-type recording medium 10, however, the defect management area can be made relatively narrow, so that even if the defect management area is placed in the lead-in area, it is unnecessary to extend the lead-in area. According to the write-once-type recording medium 10, the defect management area 13 can be placed in the lead-in area, which allows the compatibility between the write-once-type recording medium 10 and a general rewritable-type recording medium.

Various Aspects in First Embodiment of Write-Once-Type Recording Medium

Various aspects in the first embodiment of the write-once-type recording medium of the present invention will be explained.

Firstly, a first aspect will be explained. As described above, the index information is appended to at least one of the plurality of partial defect lists. The partial defect list to which this index information is appended may be placed anywhere in the defect management area. However, the partial defect list to which the index information is appended is preferably placed at the end of the plurality of partial defect lists recorded successively in a row in the defect management area. In an example in FIG. 2, the partial defect list 15D to which the index information 16 is appended is placed at the end in the defect management area. If it is possible to detect the partial defect list placed at the end in the defect management area, the reference to the index information appended to the partial defect list allows the specification of the partial defect lists carrying the newest information. The detection of the partial defect list placed at the end in the defect management area can be realized by a relatively simple method. For example, since an area following the partial defect list placed at the end in the defect management area is unrecorded, finding the boundary between an information-recorded part and an unrecorded part can facilitate the detection of the partial defect list placed at the end. It is possible to easily find the boundary between the information-recorded part and the unrecorded part by checking the change of a reading signal (e.g. a Radio Frequency (RF) signal).

Next, a second aspect will be explained. As described above, the partial defect lists correspond to the partial spare areas. The size of each partial defect list is determined by the relationship with the size of the corresponding spare area. Specifically, the size of each partial defect list is preferably large enough to record the address information with the number corresponding to the number of blocks of the record data which can be recorded in the corresponding spare area. This makes it possible to reduce the size of each partial defect list.

Next, a third aspect will be explained. Empty area information for indicating the presence or absence of an empty area in the spare area may be appended to the partial defect list placed at the end out of the plurality of partial defect lists recorded successively in a row in the defect management area. By reading the partial defect list placed at the end and referring to the empty area information appended thereto, it is possible to learn the presence or absence of the empty area in the spare area. For example, it is possible to perform the following processing by confirming this empty area information before the detection of a defect by the recording apparatus: namely, if there is an empty area in the spare area, the detection of a defect is performed, and if not, the detection of a defect is not performed. Thus, it is possible to efficiently detect a defect.

Second Embodiment of Write-Once-Type Recording Medium

Figure 5:
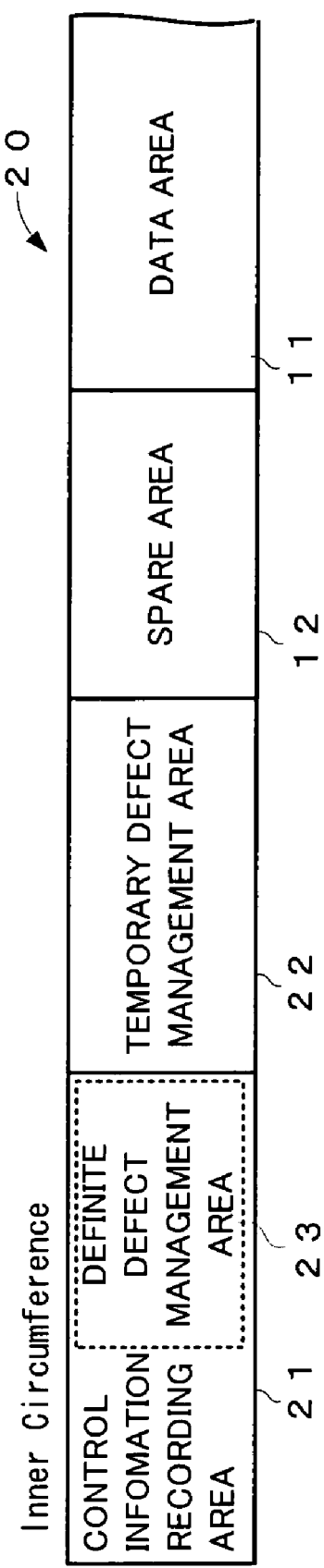
FIG. 5 is an explanatory diagram showing a second embodiment of a write-once-type recording medium of the present invention.

The second embodiment of the write-once-type recording medium of the present invention will be explained. FIG. 5 shows the recording structure in the second embodiment of the write-once-type recording medium of the present invention. A write-once-type recording medium 20 in FIG. 5 is a disk-shaped recording medium, and the left side of FIG. 5 indicates the inner circumferential side of the disk. The recording medium 20 is provided with: the data area 11; and the spare area 12, as with the write-once-type recording medium 10. The recording medium 20 is further provided with a control information recording area 21 in which information for controlling the recording and/or reading in the data area 11 is recorded. The recording medium 20 is further provided with a temporary defect management area 22 which is placed between the control information recording area 21 and the data area 11 and in which the defect management information is temporarily recorded; and a definite defect management area 23 which is placed in the control information recording area 21 and in which the defect management information is definitely recorded.

The control information recording area 21 is a lead-in area or a lead-out area in the case of an optical disk, for example. FIG. 5 shows an example in which the control information recording area 21 is on the inner circumferential side of the disc, but the control information recording area 21 may be placed in another place, such as on the outer circumferential side of the disk.

There are the temporary defect management area 22 and the definite defect management area 23 on the recording medium 20. These two defect management areas are both intended to record the defect management information. However, these two defect management areas are provided for their own different purposes, and their physical structures are different from each other.

The temporary defect management area 22 is intended to temporarily record the defect management information into it. For example, the temporary defect management area 22 is used to record therein the defect management information until the recording medium 20 is finalized. Specifically, if the defect management information is made upon initializing or formatting the recording medium 20, the defect management information is recorded into the temporary defect management area 22. If the defect management information is updated upon recording the record data, the defect management information (the partial defect list) is recorded in the temporary defect management area 22.

The temporary defect management area 22 is a larger area than the definite defect management area 23. This purpose is to record a plurality of defect management information, responding to the number of the updating of the defect management information when it is updated several times.

The temporary defect management area 22 is placed between the control information recording area 21 and the data area 11. As described above, if it is constructed such that only the partial defect list required for updating is recorded upon updating the defect management information, it is possible to reduce the size of the defect management area. Therefore, it is possible to place the defect management area in the lead-in area without extending the lead-in area. However, because the recording medium is not a rewritable type but a write-once-type, it is necessary to reserve the defect management area to be large, compared to the case of a rewritable type. In order to further increase the reliability of the recording and/or reproducing of the record data, it is preferable to extend the spare area. Along with this extension, the size of the partial defect list increases. Thus, in order to further increase the reliability of the recording and/or reproducing of the record data, it is preferable to extend the defect management area. Considering such a request, it is difficult to place the defect management area in the lead-in area without extending the lead-in area. In the recording medium 20 in the second embodiment, however, it is unnecessary to extend the control information recording area 21 to reserve the temporary defect management area 22 because the temporary defect management area 22 is placed out of the control information recording area 21. Moreover, information recorded in the temporary defect management area 22 is the defect management information, and this is not the record data but the control information in view of its properties. Therefore, it is not preferable to place the temporary defect management area 22 in the data area 11 which is intended to record the "record data". In the embodiment, the temporary defect management area 22 is placed out of the data area 11, so that it is possible to avoid such an unprefarable situation.

By placing the temporary defect management area 22 between the control information recording area 21 and the data area 11 as described above, the temporary defect management area 22 can be placed on the recording medium 20 without extending the control information recording area 21 and without placing it in the data area 11. This allows the compatibility between the write-once-type recording medium 20 and a general rewritable-type recording medium.

On the other hand, the definite defect management area 23 is intended to definitely record the defect management information. For example, when the recording medium 20 is finalized, so that the defect management information is no longer updated and the content of the defect management information is determined, the definite defect management area 23 is used to record therein the defect management information. For example, when a user inputs an instruction for indicating to finalize to the recording apparatus, the recording apparatus records the newest defect management information stored in the memory placed inside the recording apparatus, into the definite defect management area 23.

The definite defect management area 23 is a narrower area than the temporary defect management area 22. This is because all it needs is that at least one defect management information whose content is fixed can be recorded in the area.

The definite defect management area 23 is placed in the control information recording area 21. Most rewritable-type recording media generally spread have such a structure that the defect management area is placed in the control information recording area. Moreover, most rewritable-type recording media which will be developed from now on will predictably have such a structure that the defect management area is placed in the control information recording area. One of the reasons is as follows. For example, the defect management information to be recorded in the defect management area belongs to the control information in view of its properties and is mainly used directly for the operation control of the drive apparatus. Thus it is reasonable and efficient to record it with other control information in the control information recording area. Another reason is as follows. For example, in the case of a rewritable-type recording medium, even if the defect management information is updated many times, it is enough to overwrite the updated defect management information at the same position in the defect management area. Thus it is enough to ensure the relatively narrow defect management area at which at least one set of the defect management information can be recorded, and it is unnecessary to extend the control information recording area. In the embodiment, the same structure as that of such a general rewritable-type recording medium is adopted by placing the definite defect management area 23 in the control information recording area 21. This allows the compatibility between the write-once-type recording medium 20 and a general rewritable-type recording medium.

As described above, according to the recording medium 20, the temporary defect management area 22 is placed between the control information recording area 21 and the data area 11, so that the recording medium 20 can ensure the compatibility with a general rewritable-type recording medium although the recording medium 20 is not rewritable-type but write-once-type. Therefore, the record data recorded on the recording medium 20 can be accurately reproduced by the reproducing apparatus for a general rewritable-type recording medium or the like.

Moreover, the temporary defect management area 22 is placed between the control information recording area 21 and the data area 11, so that it is also possible to ensure the temporary defect management area 22 to be large.

Incidentally, if the temporary defect management area 22 is extended, the data area 11 is narrowed by that much and a recording capacity for the record data is decreased, which is disadvantageous. The recording medium 20 in the second embodiment, however, is constructed such that only the partial defect list required for updating is recorded in the temporary defect management area 22. Thus, it is possible to reduce the amount of information which is recorded, compared to the case where the defect list as a whole is recorded. It is also possible to reduce the size of the temporary defect management area 22. Therefore, it is possible to harmonize the increase of the reliability of the recording and reproducing of the record data and the ensuring of a recording capacity for the record data.

Various Aspects in Second Embodiment of Write-Once-Type Recording Medium

Various aspects in the second embodiment of the write-once-type recording medium of the present invention will be explained. As described above, the defect list is included in the defect management information. In addition to this, definition information for specifying the positions of the data area and the spare area may be included in the defect management information.

In general, position information for indicating the position of the data area is recorded in the defect management area in the control information recording area on the existing rewritable-type recording medium. A reproducing apparatus for the rewritable-type recording medium reads this position information and recognizes the position of the data area on the recording medium. If so, the write-once-type recording medium can be reproduced by the reproducing apparatus for the rewritable-type recording medium, by recording the information of the same type of this position information in the definite defect management area 23 on the write-once-type recording medium, which is the object of the recording by the recording apparatus 20. Thus, in the embodiment, the definition information for indicating the position of the data area 11 is included in the defect management information. When the defect management information including the definition information is recorded into the definite defect management area 23 on the recording medium 20 after the finalizing, the recording medium 20 can be reproduced by the reproducing apparatus for the rewritable-type recording medium.

The reproducing apparatus for the rewritable-type recording medium reads the definition information recorded in the definite defect management area on the write-once-type recording medium and recognizes the position of the data area on the recording medium on the basis of this definition information. Therefore, logically speaking, if the position information is eventually recorded as the definition information in the definite defect management area, it is possible to arbitrarily set the position of the data area on the write-once-type recording medium (although there are limitations by a standard or the like in practice). If so, for example, when the write-once-type recording medium is initialized or formatted, it is possible to reserve the temporary defect management area to be large, and by just much, the start address of the data area can be also shifted backward. This makes it possible to reserve the temporary defect management area to be large while maintaining the compatibility about the reproduction of the write-once-type recording medium and the rewritable-type recording medium.

First Embodiment of Recording Apparatus

Figure 6:
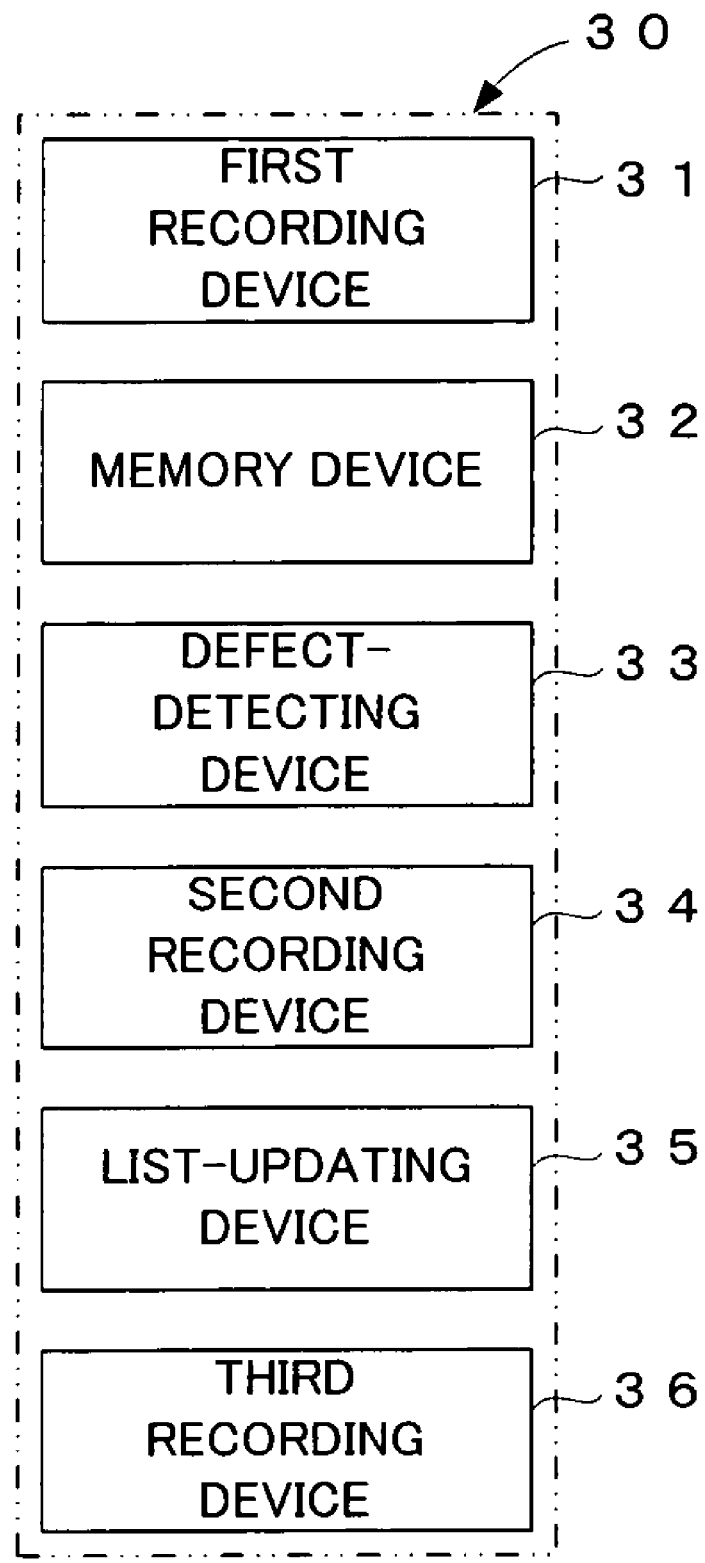
FIG. 6 is a block diagram showing a first embodiment of a recording apparatus of the present invention.

The first embodiment of the recording apparatus of the present invention will be explained. FIG. 6 shows the first embodiment of the recording apparatus of the present invention. A recording apparatus 30 in FIG. 6 is a recording apparatus for recording record data on a write-once-type recording medium which allows the recording of the record data only once at each position. The write-once-type recording medium is provided with: (i) a data area in which the record data is recorded; (ii) a spare area in which the record data to be recorded or already recorded at the position of a defect in the data area is recorded; and (iii) a defect management area in which the defect management information including a defect list is recorded. The defect list indicates the position of the defect in the data area and the position in the spare area of the record data. The spare area is divided into a plurality of partial spare areas. The defect list is divided into a plurality of partial defect lists. The plurality of partial spare areas correspond to the plurality of partial defect lists, respectively. For example, the recording apparatus 30 is intended to record the "record data" onto the above-described recording medium 10.

As shown in FIG. 6, the recording apparatus 30 is provided with: a first recording device 31; a memory device 32; a defect-detecting device 33; a second recording device 34; a list-updating device 35; and a third recording device 36.

The first recording device 31 records the record data into the data area. If the recording medium is an optical disk, the first recording device 31 can be realized by an optical pickup, a controller for controlling the optical pickup, and the like. Incidentally, if the recording medium is an optical-type, the optical pickup is preferably used as a device for directly recording data or information onto the recording medium. However, if the recording medium is other types, such as magnetic, magneto optical, and a type of using the change of a dielectric constant, it is possible to use a pickup, a head, a probe, or the like, which is appropriate for the type of the recording medium.

The memory device 32 stores therein the defect management information. The memory device 32 can be realized by a memory or the like, for example.

The defect-detecting device 33 detects a defect in the data area. There is a method of using the verifying upon recording, for example, as a method of detecting a defect. Namely, immediately after one block of the record data is recorded into the data area, the defect-detecting device 33 reads the one block of the record data and checks whether or not the recording is performed normally. At this time, when the imperfection in recording of the record data is clarified, it is estimated that there is a defect at a position where the record data is recorded or supposed to be recorded. As described above, it is possible to detect a defect by checking the result of the verifying.

The second recording device 34 records the record data to be recorded at the position in the data area of the defect detected by the defect-detecting device 33, into any one of the partial spare areas.

The list-updating device 35 updates the partial defect list by recording, onto the partial defect list corresponding to the partial spare area, the information (e.g. the address information) for indicating (i) the position of the defect detected by the defect-detecting device 33 and (ii) the position in the partial spare area at which the record data to be recorded at the position of the defect is recorded.

The third recording device 36 selects the partial defect list updated by the list-updating device 35 from among the plurality of partial defect lists included in the defect management information stored in the memory device 32 and records this list into the defect management area. Incidentally, a plurality of sets of hardware, which constitute the first recording device 31, the second recording device 34, and the third recording device 36, may be provided individually, but usually, one set is enough. For example, it is enough to provide one optical pickup, one controller, and two software for controlling the controller corresponding to the relative recording devices.

Hereinafter, the operation of the recording apparatus 30 will be explained. When recording the record data onto the write-once-type recording medium, a user inserts or loads this recording medium into the recording apparatus 30. When the defect management information is recorded in the defect management area on the recording medium, the recording apparatus 30 reads this information and stores it into the memory device 32. When the recording medium is not initialized nor formatted, the recording apparatus 30 initializes or formats the recording medium, and at the same time, makes the defect management information. The recording apparatus 30 records this information into the defect management area on the recording medium and stores this information into the memory device 32.

Then, the first recording device 31 records the record data into the data area on the recording medium. The record data is verified upon recording it. The defect-detecting device 33 detects a defect in the data area on the basis of the result of the verifying. When a defect is detected, the second recording device 34 records the record data to be recorded at the position, into the data area of the defect in any one of the partial spare areas. The list-updating device 35 records, onto the partial defect list corresponding to the partial spare area, the information for indicating the position of the defect and the position in the partial spare area at which the record data to be recorded at the position of the defect is recorded, and thus updates the partial defect list.

Then, when the recording of the record data by the first recording device 32 is ended, the third recording device 36 selects the partial defect list updated by the list-updating device 35 from among the plurality of partial defect lists included in the defect management information stored in the memory device 32, and records this list into the defect management area.

As described above, according to the recording apparatus 30, it selects only the updated partial defect list and records this list into the defect management area. Thus it is possible to reduce the amount of information which is recorded in the defect management area. Because of this, it is no longer necessary to provide the large defect management area for the recording medium, and as described above, it is possible to realize the ensuring of a recording capacity and the compatibility between the write-once-type recording medium and a rewritable-type recording medium.

Various Aspects in First Embodiment of Recording Apparatus

Figure 7:
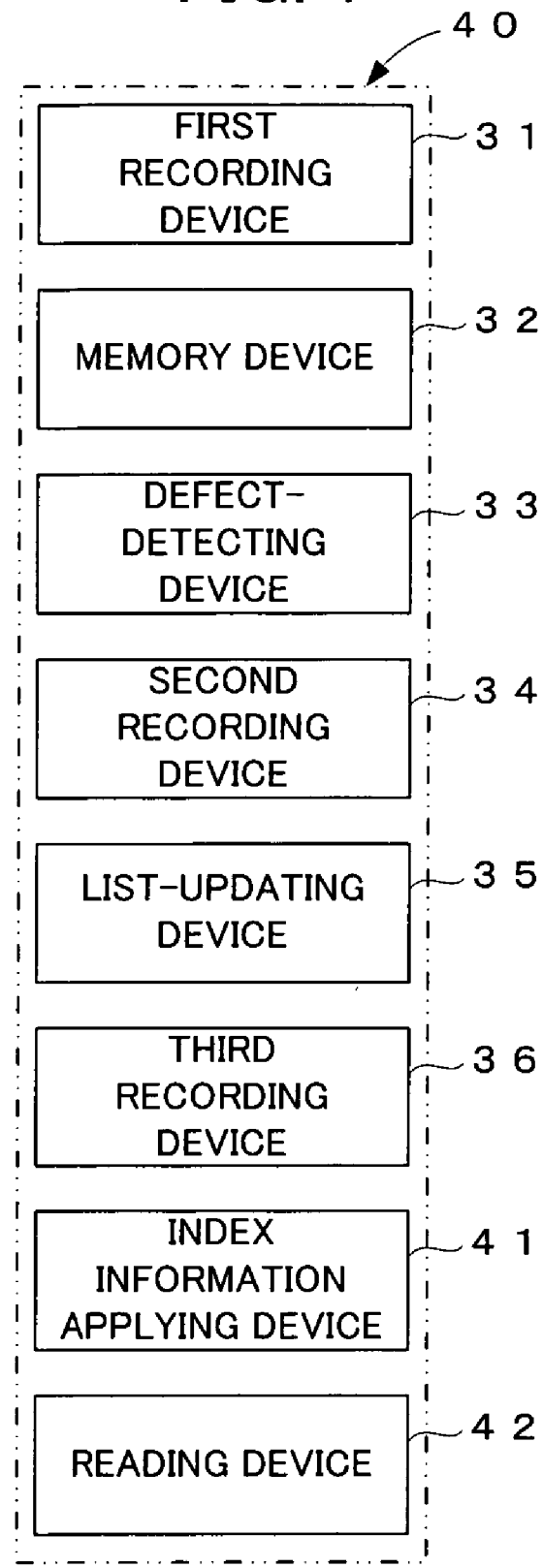
FIG. 7 is a block diagram showing various aspects of the first embodiment of a recording apparatus of the present invention.

Various aspects in the first embodiment of the recording apparatus of the present invention will be explained. FIG. 7 shows various aspects in the first embodiment of the recording apparatus of the present invention.

Firstly, a first aspect will be explained. As shown in a recording apparatus 40 in FIG. 7, it may be provided with an index information applying device 41 in addition to each constitutional element of the recording apparatus 30. The index information applying device 41 applies (i.e., appends) the index information, which can be an index for specifying the partial defect lists carrying the newest information, to the partial defect list updated by the list-updating device 35. In this case, the third recording device 36 records, into the defect management area, the partial defect list updated by the list-updating device 35 together with the index information.

The index information becomes an index for specifying the partial defect lists carrying the newest information. Thus, with reference to the index information, it is possible to specify the partial defect lists carrying the newest information from among the plurality of partial defect lists recorded in the defect management area. Then it is possible to read them and connect them with one defect list (refer to FIG. 3 or FIG. 4).

Figure 4:
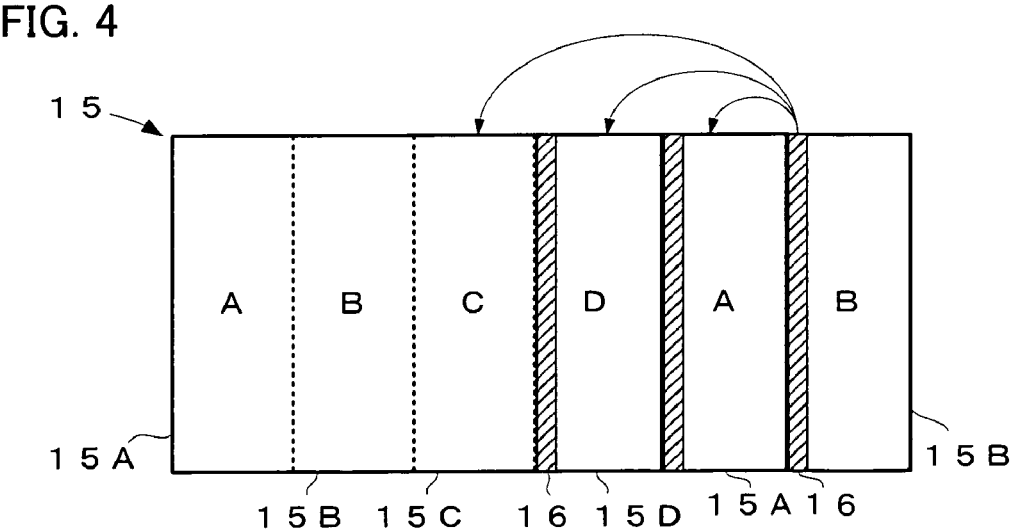
FIG. 4 is an explanatory diagram showing another state in the defect management area in the first embodiment.

Next, a second aspect will be explained. As shown in the recording apparatus 40 in FIG. 7, it may be further provided with a reading device 42 in addition to each constitutional element of the recording apparatus 30. The reading device 42 specifies the plurality of partial defect lists included in the defect management information recorded in the defect management area on the recording medium on the basis of the index of the index information, reads the specified plurality of partial defect lists, connects the read plurality of partial defect lists to form one defect list, and stores this one defect list into the memory device 32. According to the reading device 42, even if there are the partial defect lists unnecessary for constituting one defect list because the updating of the partial defect list is performed several times, as shown in FIG. 4, it is possible to surely select the partial defect lists necessary for constituting one defect list, and it is possible to realize one defect list by connecting the selected partial defect lists.

Second Embodiment of Recording Apparatus

Figure 8:
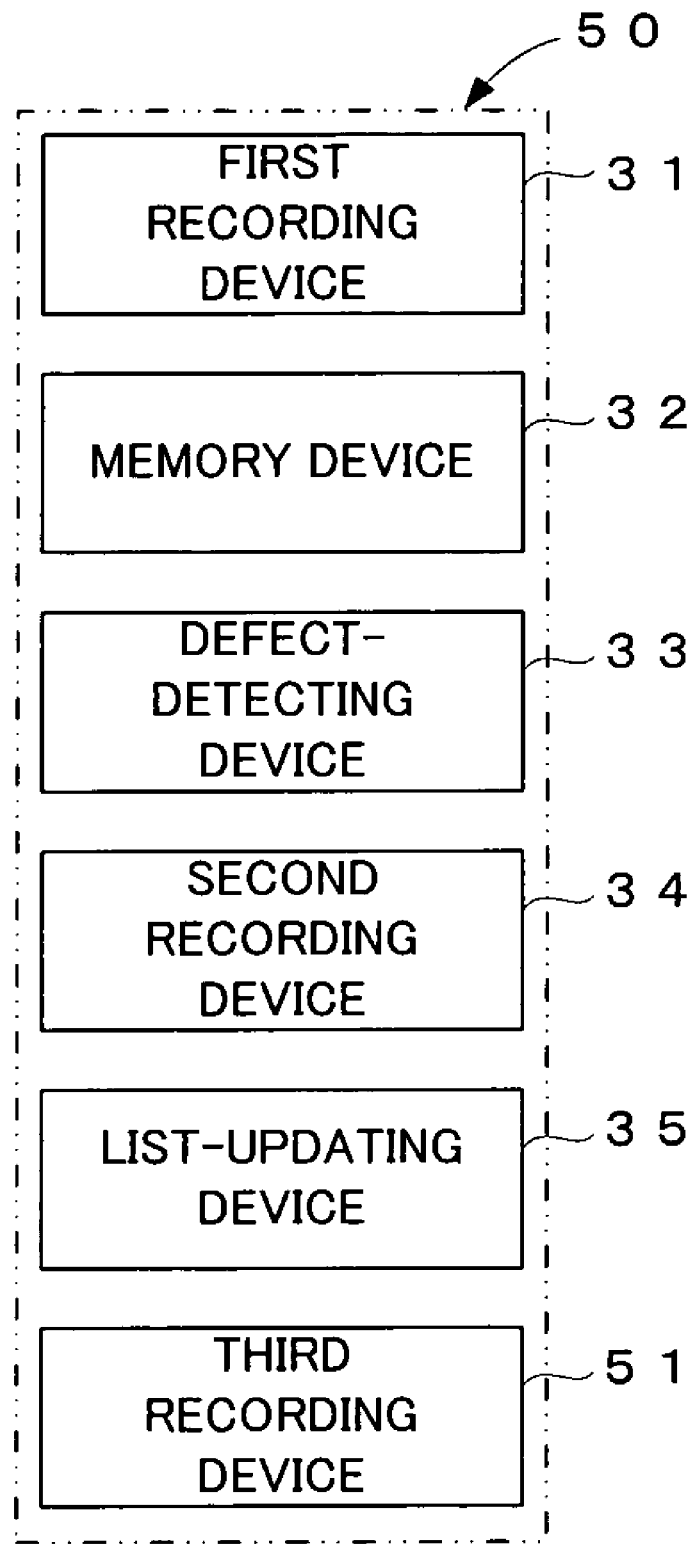
FIG. 8 is a block diagram showing a second embodiment of a reproducing apparatus of the present invention.

The second embodiment of the recording apparatus of the present invention will be explained. FIG. 8 shows the second embodiment of the recording apparatus of the present invention. A recording apparatus 50 in FIG. 8 is a second recording apparatus for recording the record data onto a write-once-type recording medium which allows an operation of recording the record data only once at each position. The write-once-type recording medium is provided with: (i) a data area in which the record data is recorded; (ii) a spare area in which the record data to be recorded or already recorded at the position of a defect in the data area is recorded; (iii) a temporary defect management area in which defect management information including a defect list is temporarily recorded, the defect list indicating the position of the defect in the data area and the position in the spare area of the record data, and (iv) a definite defect management area in which the defect management information is definitely recorded. The spare area is divided into a plurality of partial spare areas. The defect list is divided into a plurality of partial defect lists. The plurality of partial spare areas correspond to the plurality of partial defect lists, respectively.

The recording apparatus 50 is provided with: the first recording device 31; the memory device 32; the defect-detecting device 33; the second recording device 34; and the list-updating device 35, as with the recording apparatus 30. The recording apparatus 50 is also provided with a third recording device 51.

The third recording device 51 selects the partial defect list updated by the list-updating device 35 from among the plurality of partial defect lists included in the defect management information stored in the memory device 32 and records this list into the temporary defect management area. Except the fact that a place in which the partial defect list is recorded is the temporary defect management area, the third recording device 51 is the same as the third recording device 36 of the recording apparatus 30.

As described above, according to the recording apparatus 50, it selects only the updated partial defect list and records this list into the temporary defect management area. Thus it is possible to reduce the amount of information which is recorded in the temporary defect management area. Because of this, it is no longer necessary to provide the large temporary defect management area for the recording medium, and as described above, it is possible to realize the ensuring of a recording capacity and the compatibility between the write-once-type recording medium and a rewritable-type recording medium.

Various Aspects in Second Embodiment of Recording Apparatus

Figure 9:
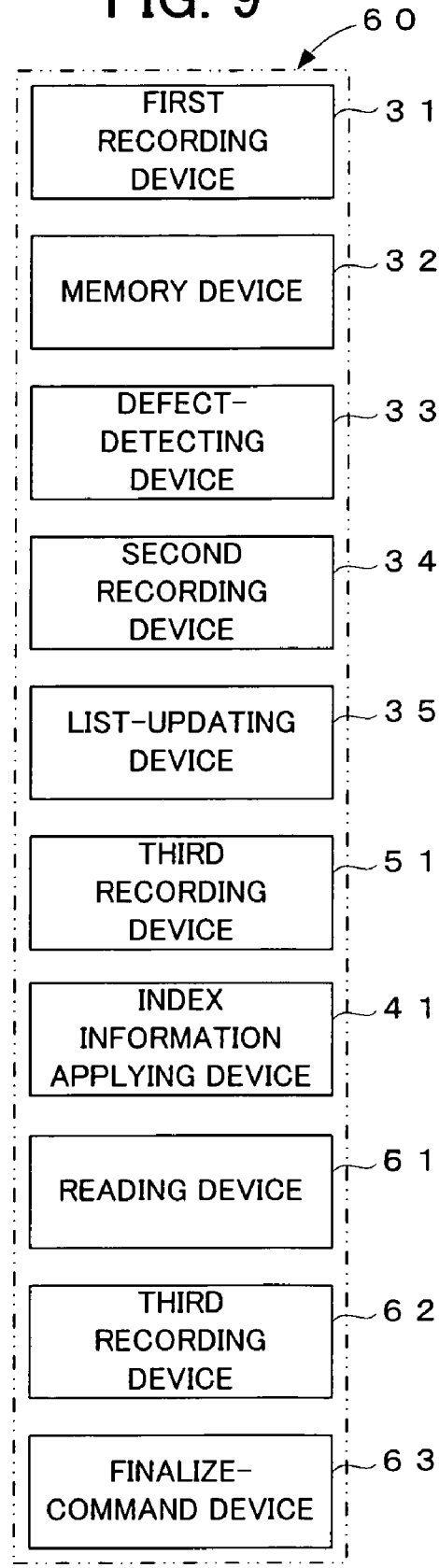
FIG. 9 is a block diagram showing various aspects of the second embodiment of a recording apparatus of the present invention.

Various aspects in the second embodiment of the recording apparatus of the present invention will be explained. FIG. 9 shows various aspects in the second embodiment of the recording apparatus of the present invention. As shown in a recording apparatus 60 in FIG. 9, it may be further provided with the index information applying device 41 in addition to each constitutional element of the recording apparatus 50.

The recording apparatus 60 may be further provided with a reading device 61. The reading device 61 specifies the plurality of partial defect lists included in the temporary defect management information recorded in the defect management area on the write-once-type recording medium on the basis of the index of the index information, reads the specified plurality of partial defect lists, connects the read plurality of partial defect lists to form one defect list, and stores this one defect list into the memory device 32.

The recording apparatus 60 may be further provided with a fourth recording device 62. The fourth recording device 62 records the one defect list stored in the memory device 32, into the definite defect management area. According to the fourth recording device 62, by recording the defect list into the definite defect management area, it is possible to establish the compatibility between the write-once-type recording medium and a rewritable-type recording medium.

The recording apparatus 60 may be further provided with a finalize-command device 63. The finalize-command device 63 gives a finalize-command for indicating to finalize the write-once-type recording medium. In this case, the fourth recording device 62 records the one defect list into the definite defect management area in response to the finalize-command.

Incidentally, the embodiments described above may be realized in an integral form with hardware as an exclusive apparatus or may be realized by making a computer read a program.

Embodiment of Recording Method

The embodiment of a recording method of the present invention will be explained. This recording method is a recording method of recording the record data onto a write-once-type recording medium which allows the recording of the record data only once at each position. The write-once-type recording medium is provided with: (i) a data area in which the record data is recorded; (ii) a spare area in which the record data to be recorded or already recorded at the position of a defect in the data area is recorded; and (iii) a defect management area in which defect management information including a defect list is recorded. The defect list indicates the position of the defect in the data area and the position in the spare area of the record data. The spare area is divided into a plurality of partial spare areas. The defect list is divided into a plurality of partial defect lists. The plurality of partial spare areas correspond to the plurality of partial defect lists, respectively.

Then, this recording method is provided with: a storing process of storing the defect management information; a first recording process of recording the record data into the data area; a defect-detecting process of detecting a defect in the data area; a second recording process of recording the record data to be recorded at the position in the data area of the defect detected in the defect-detecting process in any one of the partial spare areas; a list-updating process of updating the partial defect list by recording, onto the partial defect list corresponding to the partial spare area, information for indicating the position of the defect detected in the defect-detecting process and the position in the partial spare area at which the record data to be recorded at the position of the defect is recorded; and a third recording process of selecting the partial defect list updated in the list-updating process from among the plurality of partial defect lists included in the defect management information stored in the memory process and recording the selected list into the defect management area.

According to the recording method, it selects only the updated partial defect list and records this list into the defect management area. Thus it is possible to reduce the amount of information which is recorded in the defect management area. Because of this, it is no longer necessary to provide the large defect management area for the recording medium, and as described above, it is possible to realize the ensuring of a recording capacity and the compatibility between the write-once-type recording medium and a rewritable-type recording medium.

EXAMPLES

Examples of the present invention will be hereinafter explained with reference to the drawings. The examples below show that the write-once-type recording medium of the present invention is applied to a write-once-type optical disk and that the recording apparatus of the present invention are applied to a recording/reproducing apparatus for the write-once-type optical disk.

Example of Recording Medium

Figure 10:
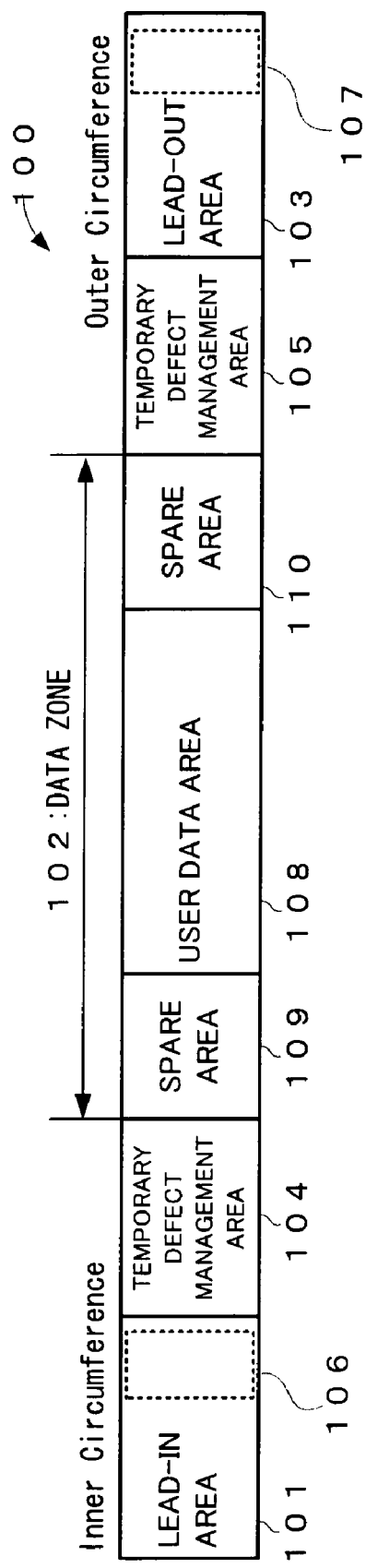
FIG. 10 is an explanatory diagram showing an example of a write-once-type recording medium of the present invention.

Firstly, the recording structure of the write-once type optical disk in the example of the present invention and information and data recorded on the optical disk will be explained. FIG. 10 shows the write-once-type recording medium which is the example of the present invention. Incidentally, the left side of FIG. 10 is the inner circumferential side of a write-once-type optical disk 100, and the right side of FIG. 10 is the outer circumferential side of the optical disk 100.

As shown in FIG. 10, there are a lead-in area 101 on the inner circumferential side, a data zone 102 on the outer circumferential side of the lead-in area 101, and a lead-out area 103 on the outer circumferential side of the data zone 102 on a recording surface of the write-once-type optical disk 100. A temporary defect management area 104 is placed between the lead-in area 101 and the data zone 102. A temporary defect management area 105 is placed between the data zone 102 and the lead-out area 103.

In both the lead-in area 101 and the lead-out area 103, control information for controlling and management information for managing the recording and reading of information or data on the optical disk 100 are recorded. The lead-in area 101 is provided with a definite defect management area 106. The lead-out area 103 has a definite defect management area 108. In both the defect management areas 106 and 107, defect management information 120 (refer to FIG. 11) is recorded.

In the data zone 102, the record data, such as image data, audio data, and contents data, is recorded. The data zone 102 is provided with: a user data area 108; and spare areas 109 and 110 on the inner and outer circumferential sides of the user data area 108, respectively. The user data area 108 is a main area to record the "record data". The spare areas 109 and 110 are intended to evacuate the record data from a defect in the user data area 108. Namely, when a defect in the user data area 108 is detected by the recording/reproducing apparatus 200, the record data to be recorded or already recorded at the position of the defect is alternatively recorded into the spare area 109 or 110.

Figure 11:
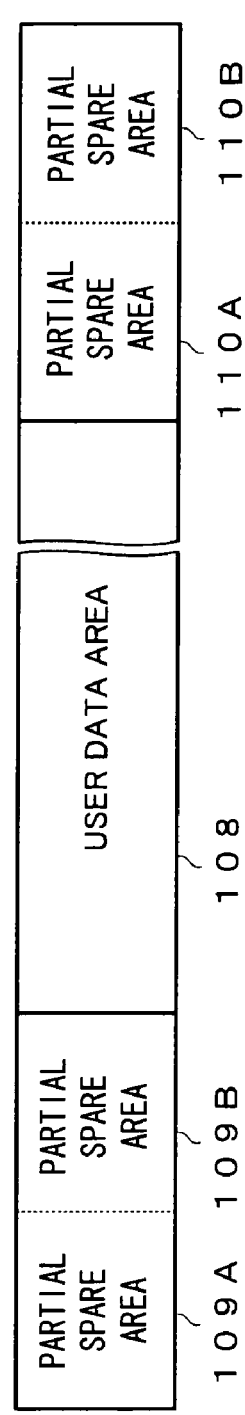
FIG. 11 is an enlarged explanatory diagram showing a user data area and a spare area on the recording medium in the example.

FIG. 11 is an enlarged diagram showing the data zone 102 in FIG. 10. As shown in FIG. 11, the spare area 109 is divided into tow partial spare areas 109A and 109B. The spare area 110 is divided into two partial spare areas 110A and 110B.

In the example, every time a defect is detected, the record data is recorded into the partial spare areas 109A, 109B, 110A, and 110B in this order. Namely, firstly, the record data is recorded into the partial spare area 109A. When the partial spare area 109A is full of the record data, the record data is then recorded into the partial spare area 109B. When the partial spare area 109B is full of the record data, the record data is then recorded into the partial spare area 110A. When the partial spare area 110A is full of the record data, the record data is then recorded into the partial spare area 110B.

In the both the temporary defect management areas 104 and 105, the defect management information 120 is recorded temporarily.

Next, the defect management information 120 will be explained. The defect management information 120 is used for the defect management performed by a recording/reproducing apparatus 200 (refer to FIG. 14). The recording/reproducing apparatus 200 performs the defect management when recording the record data onto the optical disk 100 or when reproducing the record data from the optical disk 100. In the example, the defect management is mainly as follows. When there is a defect, such as scratches, dusts, or deterioration, on the user data area on the optical disk 100, the record data is recorded away from the position of the defect. At the same time, the record data to be originally recorded or already recorded at the position of the defect is recorded into the spare area 109 or 110. Moreover, the following operations are also performed as a part of the defect management: an operation of recognizing the position of a defect upon reproducing the record data recorded in the user data area 108 and an operation of reading from the spare area 109 or 110 the record data to be originally recorded or already recorded at the position of the defect. In order to perform such a defect management, the recording/reproducing apparatus 200 needs to recognize the position of a defect in the user data area 108. The defect management information 120 is mainly used for the recording/reproducing apparatus 200 to recognize the position of a defect.

FIG. 12 shows the content of defect management information 120. As shown in FIG. 12, setting information 121 and a defect list 122 are included in the defect management information 120.

The setting information 121 includes: a start address of the user data area 108; an end address of the user data area 108; the size of the inner spare area 109; the size of the outer spare area 110; and other information, as shown in FIG. 12.

As shown in FIG. 12, the defect list 122 is divided into four partial defect lists 122A to 122D. The partial defect lists 122A, 122B, 122C, and 122D correspond to the partial spare areas 109A, 109B, 110A, and 110B, respectively.

In each of the partial defect lists 122A to 122D, there are recorded an address for indicating the position of a defect in the user data area 108 (which is hereinafter referred to as a "defect address"), an address for indicating the recording position in the partial spare area 109A, 109B, 110A, or 110B of the record data to be recorded or already recorded at the position of the defect (which is hereinafter referred to as a "spare address"); and other information. The spare address recorded in each of the partial defect lists 122A to 122D is an address for indicating any one of the positions in the partial spare area 109A, 109B, 111A, and 110B corresponding to the partial defect lists. FIG. 13 shows one example of the content of the partial defect list 122A.

When a defect is detected by the recording/reproducing apparatus 200, the defect address of the defect and the corresponding spare address are recorded onto any one of the partial defect lists 122A to 122D. In the example, every time a defect is detected, the record data is recorded into the partial spare areas 109A, 109B, 110A, and 110B in this order. Thus, with respect to the defect list, the defect address and the spare address are recorded onto the partial defect lists 122A, 122B, 122C, and 122D in this order.

Moreover, the identifier for identifying its own partial defect list and the start address of the partial spare area corresponding to the list itself are appended to each of the partial defect lists 122A to 122D as the management information (e.g. a header) (which are not illustrated).

Furthermore, the empty area information for indicating the presence or absence of an empty area in the spare areas 109 and 110 as a whole is appended to the partial defect list 122D as the management information (e.g. a header) (which are not illustrated).

As shown in FIG. 12, index information 123 is also appended to the partial defect list 122D. The index information 123 includes information for indicating the identifier of the partial defect lists 122A to 122C. This index information 123 is appended to the partial defect list 122D of the defect list 122, which is made upon the initialization of the optical disk 100. It is also appended to the partial defect list, which is updated by detecting a defect after the initialization (refer to FIG. 3 or FIG. 4).

Incidentally, the defect management can be performed not only for the user data area 108 on the optical disk 100 but also for all of the recording surfaces of the optical disk 100.

Next, an aspect about the recording of the defect management information 120 will be explained. The temporary defect management areas 104 and 105 on the optical disk 100 and the definite defect management areas 106 and 107 are all intended to record therein the defect management information 120. However, the temporary defect management areas 104 and 105 on the optical disk 100 and the definite defect management areas 106 and 107 differ in their locations, sizes, and purposes for use. Hereinafter, their differences will be specifically explained.

The temporary defect management areas 104 and 105 are intended to record the defect management information 120 temporarily until the optical disk 100 is finalized. The defect management information 120 is necessary for the defect management. The presence or absence and position of a defect are different for each optical disk, so that it is necessary to record and maintain the defect management information 120 on each optical disk. In the example, at a stage before the finalizing, the defect management information 120 is recorded and maintained in the temporary defect management area 104 or 105 on the optical disk 100.

Until the optical disk 100 is finalized, the defect management information 120 may be updated several times in some cases. For example, if dusts are attached on the optical disk 100 between the first recording and the second recording (additional recording), the defect (or dusts) is detected upon the second recording. Then, the record data to be recorded at the position of the defect is recorded into any one of the partial spare areas 109A to 110B. On the basis of this detection and recording, the defect address and the spare address are recorded onto the partial defect list corresponding to any one of the partial spare areas 109A to 110B in which the record data is newly recorded, and the partial defect list is updated. As long as the detected defect is not outrageously large, one partial defect list is updated at one defect detection. When the one partial defect list is updated, the updated partial defect list is recorded into the temporary defect management area 104 or 105. The optical disk 100 is a write-once-type recording medium but not a rewritable-type recording medium, so that it is impossible to overwrite the updated partial defect list into the existing place. Thus, the updated partial defect list is recorded in series after the partial defect list already recorded in the temporary defect management area 104 or 105 (refer to FIG. 3 or FIG. 4).

On the other, hand, the definite defect management areas 106 and 107 are intended to record the defect management information 120 definitely when the optical disk 100 is finalized. Namely, at a stage before the finalizing, the definite defect management areas 106 and 107 are unrecorded (or blank). When the optical disk 100 is finalized, the defect management information 120 is recorded in the definite defect management areas 106 and 107, and the recording situation is continued subsequently. Incidentally, the defect list 122 recorded in the definite defect management area 106 or 107 is one defect list 122 constructed from the newest partial defect lists 122A to 122D.

According to the optical disk 100 in the present example, the spare areas 109 and 110 are divided into the partial spare areas 109A to 110B, and the defect list 122 is divided into the partial defect lists 122A to 122D, with the partial spare areas 109A to 110B corresponding to the partial defect lists 122A to 122D, respectively. Thus, when a defect is detected, all needed is to record only the updated partial defect list into the temporary defect management area 104 or 105 on the optical disk 100. Therefore, it is possible to reduce the amount of information recorded in the temporary defect management areas 104 and 105 on the optical disk 100 and to reduce the size of the temporary defect management areas 104 and 105.

According to the optical disk 100 in the example, the temporary defect management area 104 is placed between the lead-in area 101 and the data zone 102, and the temporary defect management area 105 is placed between the data zone 102 and the lead-out area 103, which allows the compatibility between the write-once-type optical disk 100 and a general rewritable-type optical disk. In order to realize the compatibility with a general rewritable-type optical disk, the write-once-type optical disk 100 needs to have the lead-in area, the data zone, and the lead-out area, and needs to maintain a basic recording structure, such as the order, position, and size (area) of the areas. The optical disk 100 maintains such a basic recording structure although it is provided with the temporary defect management areas 104 and 105, which allows the compatibility. Namely, if the temporary defect management area 104 is placed in the lead-in area 101, because the temporary defect management area 104 is required to be larger than the defect management area of the write-once-type optical disk, there is no choice to extend the size of the lead-in area 101, which is unfavorable. In this example, however, it is not necessary to extend the lead-in area because the temporary defect management area 104 is placed out of the lead-in area 101. Moreover, if the temporary defect management area 104 is placed in the data zone 102, the defect management information 120 having properties of control information is included in the data zone 102 which is an area in which record data is supposed to be recorded, causing the disadvantage that the control information and the record data, which is information having properties different from those of the control information, are mixed in the data zone 102. In this example, however, such a disadvantage does not occur because the temporary defect management area 104 is placed out of the data zone 102. The same is true for the defect management area 105.

The start address and end address of the user area 108, and the size information of the spare areas 109 and 110 are included in the setting information 121 in the defect management information 120 (refer to FIG. 12). This setting information 121 can be set by the recording/reproducing apparatus 200. Namely, it is allowed to change the start address and end address of the user area 108, and the sizes of the spare areas 109 and 110 if they are clearly shown as the setting information 121. Even if they are changed, it is possible to maintain the compatibility with a general rewritable-type recording medium. Therefore, it is possible to ensure a space between the lead-in area 101 and the data zone 102 by shifting the start address of the user data area 108 backward (to the outer circumferential side), and it is possible to place the temporary defect management area 104 in the space. The same is true for the temporary defect management area 105.

Depending on how to set the start address of the user data area 108, it is possible to reserve the relatively wider (large-sized) temporary defect management area 104. However, if the temporary defect management area 104 is extended, the user data area 108 is narrowed by that much and a recording capacity for the record data is decreased, which is disadvantageous. With respect to this point, in the present example, the temporary defect management area can be reduced by reducing the amount of information recorded in the temporary defect management area as described above. Therefore, it is possible to solve such a disadvantage.

According to the optical disk 100, the definite defect management areas 106 and 107 are placed in the lead-in area 101 and the lead-out area 103, respectively, which allows the compatibility between the write-once-type optical disk 100 and a general rewritable-type optical disk. Namely, a general rewritable-type optical disk has areas to record the defect management information, the areas being placed in both the lead-in area and the lead-out area. The optical disk 100 also has the definite defect management areas 106 and 107 placed in the lead-in area 101 and the lead-out area 103, respectively. At this point, their recording structures coincide. Therefore, it is possible to ensure the compatibility between the write-once-type optical disk 100 and a general rewritable-type optical disk.

Example of Recording/Reproducing Apparatus

Figure 14:
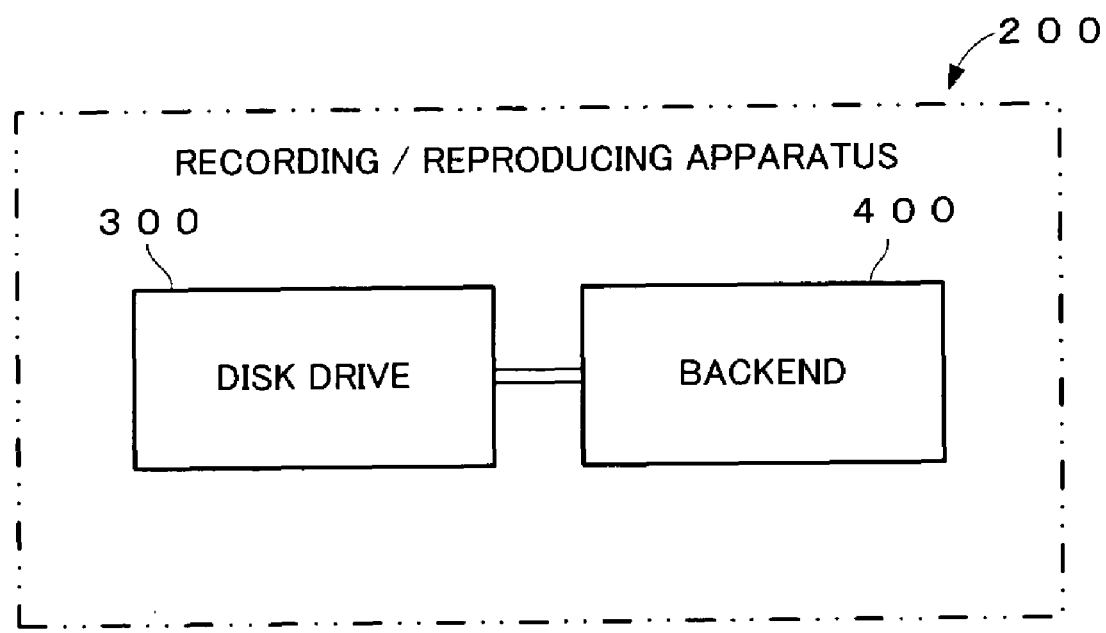
FIG. 14 is a block diagram showing a recording/reproducing apparatus, which is an example of the recording and reproducing apparatuses of the present invention.

The structure of a recording/reproducing apparatus in the example of the present invention will be explained. FIG. 14 shows the recording/reproducing apparatus 200, which is an example of the present invention. The recording/reproducing apparatus 200 is provided with: a function of recording the record data onto the optical disk 100; and a function of reproducing the record data recorded on the optical disk 100.

The recording/reproducing apparatus 200 is provided with: a disk drive 300; and a backend 400.

Figure 15:
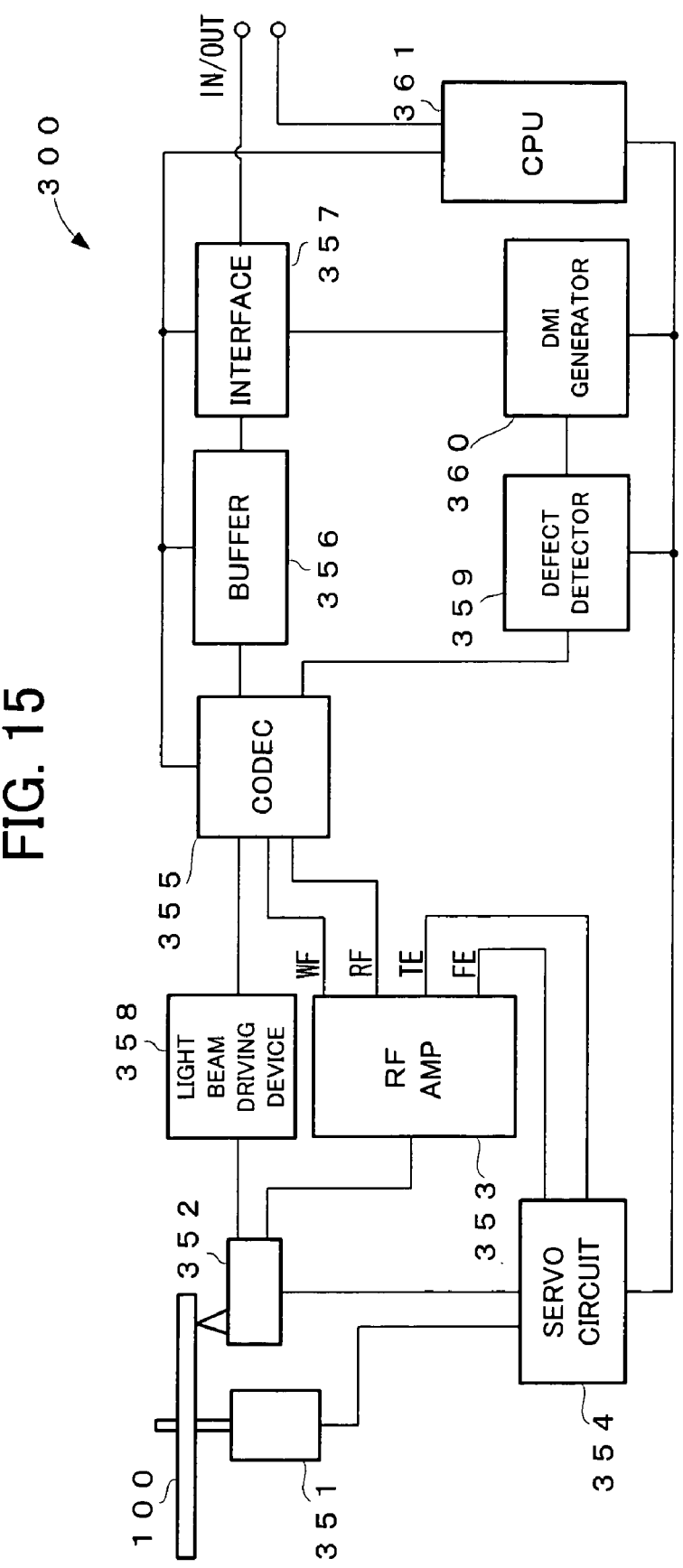
FIG. 15 is a block diagram showing a disk drive of the recording/reproducing apparatus in the example.

FIG. 15 shows the inner structure of the disk drive 300. The disk drive 300 records information onto the optical disk 100 and reads the information recorded on the optical disk 100.

As shown in FIG. 15, the disk drive 300 is provided with: a spindle motor 351; an optical pickup 352; a Radio Frequency (RF) amplifier 353; and a servo circuit 354.

The spindle motor 351 is a motor for rotating the optical disk 100.

The optical pickup 352 records the record data or the like onto the recording surface of the optical disk 100 by irradiating the recording surface with a light beam, and reads the record data or the like recorded on the recording surface by receiving reflected light of the light beam. The optical pickup 352 outputs a RF signal corresponding to the reflected light of the light beam.

The RF amplifier 353 amplifies the RF signal outputted from the optical pickup 352 and outputs it to a coder/decoder (CODEC) 355. Moreover, the RF amplifier 353 makes, from the RF signal, a wobble frequency signal WF, a track error signal TE, and a focus error signal FE, and outputs them.

The servo circuit 354 is a servo control circuit for controlling the driving of the optical pickup 352 and the spindle motor 351 on the basis of the track error signal TE, the focus error signal FE, and other servo control signals.

As shown in FIG. 15, the disk drive 300 is provided with: the CODEC 355; a buffer 356; an interface 357; and a light beam driving device 358.

The CODEC 355 is a circuit, provided with: a function of performing an error correction for the record data upon reading; and a function of appending an error correction code or mark to the record data upon recording so as to demodulate and decode the record data. Specifically, the CODEC 355 demodulates and decodes the RF signal outputted from the RF amplifier 353 upon reading, performs an error correction for the decoded RF signal, and then outputs this to the buffer 356. Moreover, if the error correction is impossible as a result of performing the error correction for the decoded RF signal, the CODEC 355 generates an error-correction-impossible signal for indicating that, and outputs this signal to a defect detector 359. Upon recording, the CODEC 355 appends the error correction code to the record data outputted from the buffer 356, demodulates and decodes this data to have a code suited to the optical characteristics or the like of the optical disk 100, and then outputs the decoded record data to the light beam driving device 358.

The buffer 356 is a memory circuit for storing the record data temporarily.

The interface 357 is a circuit for controlling the input/output or communication of the record data or the like between the disk drive 300 and the backend 400. Specifically, upon reproducing, the interface 357 responds a request command from the backend 400, and outputs the record data outputted from the buffer 356 (i.e. the record data read from the optical disk 100) to the backend 400. Upon recording, the interface 357 receives the record data which is inputted from the backend 400 to the disk drive 300, and outputs this data to the buffer 356. The interface 357 responds a request command from the backend 400 and outputs all or part of the defect lists maintained in a generator 360 for generating Defect Management Information (DMI generator 360) to the backend 400.

Upon recording, the light beam driving device 358 generates a light beam driving signal corresponding to the record data outputted from the CODEC 355, and outputs this signal to the optical pickup 352. The optical pickup 352 modulates a light beam on the basis of the light beam driving signal, and irradiates the recording surface of the optical disk 100 with it. This causes the recording of the record data or the like on the recording surface.

As shown in FIG. 15, the disk drive 300 is provided with: the defect detector 359; and the DMI generator 360.

The defect detector 359 is a circuit for detecting a defect on the optical disk 100. The defect detector 359 generates a defect detection signal for indicating the presence or absence of a defect, and outputs this signal. The defect detector 359 detects a defect on the basis of the result of the error correction of the record data upon reading information (upon verifying or reproducing). As described above, if the error correction is impossible as a result of performing the error correction for the decoded RF signal, the CODEC 355 generates the error correction impossible signal for indicating the fact, and outputs this signal to the defect detector 359. The defect detector 359 outputs the defect detection signal for indicating the presence of a defect when receiving this error correction impossible signal.

The DMI generator 360 is a circuit for generating or updating the defect management information 120 on the basis of the defect detection signal outputted from the defect detector 359. The defect management information 120 is rewritably stored into a memory circuit placed in the DMI generator 360. The DMI generator 360 responds to a request command from the backend 400 and outputs the defect management information 120 to the backend 400 through the interface 357.

As shown in FIG. 15, the disk drive 300 is equipped with a Central Processing Unit (CPU) 361. The CPU 361 controls the disk drive 300 as a whole, and controls the exchange of information among the elements in the disk drive 300 described above. The CPU 361 also controls the recording operation and reading operation of the record data and the defect management information 120. The CPU 361 responds to a control command or a request commend transmitted from the backend 400, and controls the exchange of data between the disk drive 300 and the backend 400.

Figure 16:
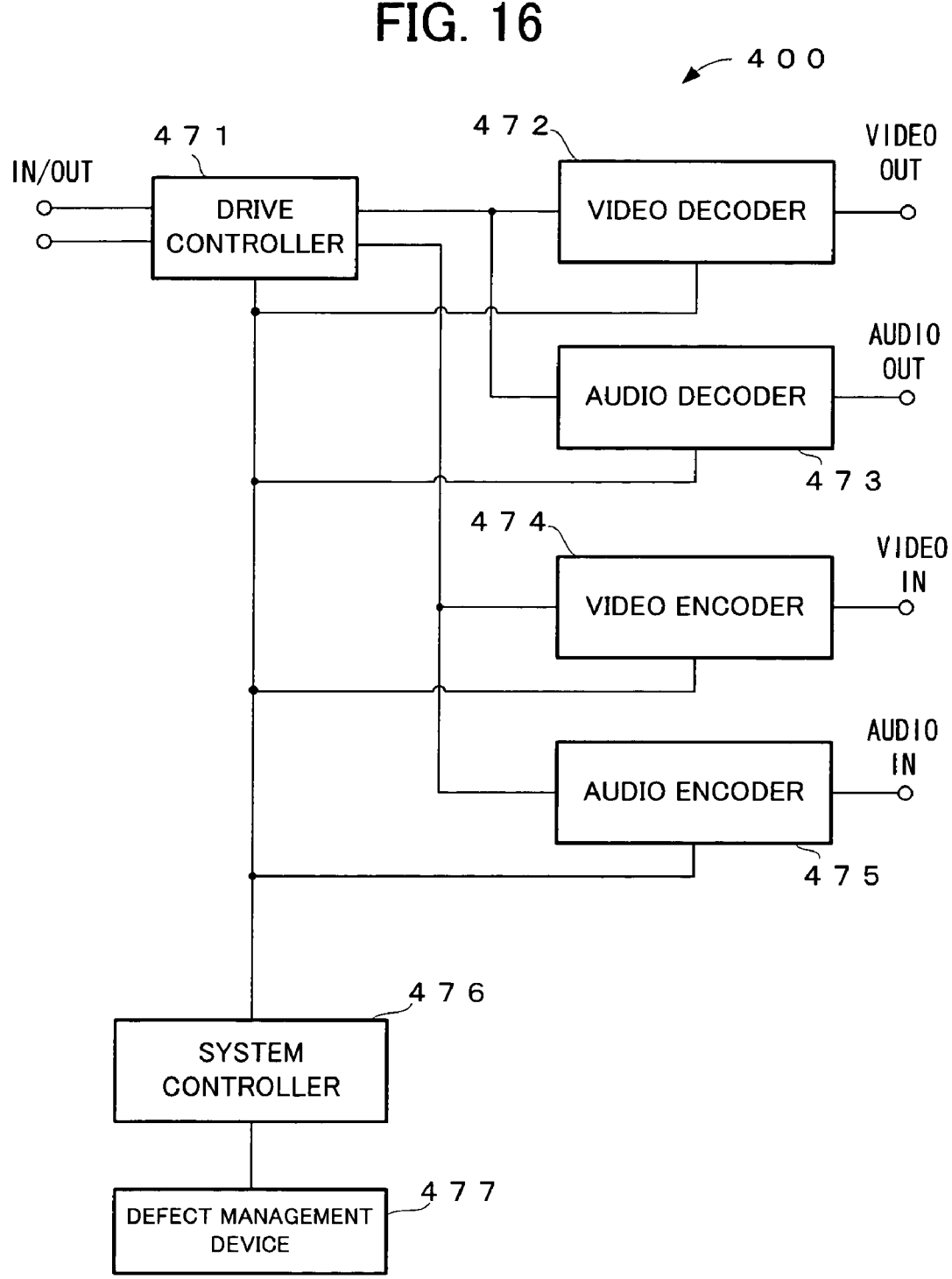
FIG. 16 is a block diagram showing a backend of the recording/reproducing apparatus in the example.

FIG. 16 shows the inner structure of the backend 400. The backend 400 is an apparatus for reproducing the record data read from the optical disk 100 with the disk drive 300, receiving the record data supplied from the outside in order to record it into the optical disk 100, compressing and encoding this record data, and transmitting it to the disk drive 300.

The backend 400 is provided with: a drive controller 471; a video decoder 472; an audio decoder 473; a video encoder 474; an audio encoder 475; a system controller 476; and a defect management device 477.

The drive controller 471 is a circuit for controlling the reading processing and recording processing of the disk drive 300. The backend 400 and the disk drive 300 cooperate and perform an operation of reading the record data from the optical disk 100 and reproducing it and an operation of receiving the record data from the outside and recording it onto the optical disk 100. The drive controller 471 realizes the cooperation of the backend 400 and the disk drive 300 by controlling the reading processing and recording processing of the disk drive 300. Specifically, the drive controller 471 outputs to the disk drive 300 request commands about reading, recording, outputting the record data from the buffer 356, outputting the defect management information 120 from the DMI generator 360, and so on. The drive controller 471 also controls the input and output of the record data, the defect management information 120, and other various information.

The video decoder 472 and the audio decoder 473 are circuits for decoding the record data which is read from the optical disk 100 by the disk drive 300 and which is supplied through the drive controller 471, and converting the record data to be reproducible with a display, a speaker, or the like.

The video encoder 474 and the audio encoder 475 are circuit for receiving a video signal, an audio signal, or the like inputted from the outside for the purpose of recording them on the optical disk 100, compressing and encoding them by Moving Picture Experts Group (MPEG) compressing and encoding method or the like, and supplying them to the disk drive 300 through the drive controller 471.

The system controller 476 is a circuit for controlling: the drive controller 471; the video decoder 472; the audio decoder 473; and the defect management device 477, and reproducing the record data in cooperation with the devices. Upon recording, the system controller 476 controls: the drive controller 471; the video encoder 474; the audio encoder 475; and the defect management device 477, to thereby record the record data in cooperation with the devices. Upon reproducing and recording, the system controller 476 controls the disk drive 300 (e.g. controls the generation and transmission of various request commands, the reception of a response signal, or the like) with the drive controller 471 in order to realize the cooperation of the disk drive 300 and the backend 400.

The defect management device 477 has therein a memory circuit and has a function of receiving and maintaining all or part of the defect management information 120 made or updated by the DMI generator 360 in the disk drive 300. The defect management device 477 performs the defect management with the system controller 476.

Figure 17:
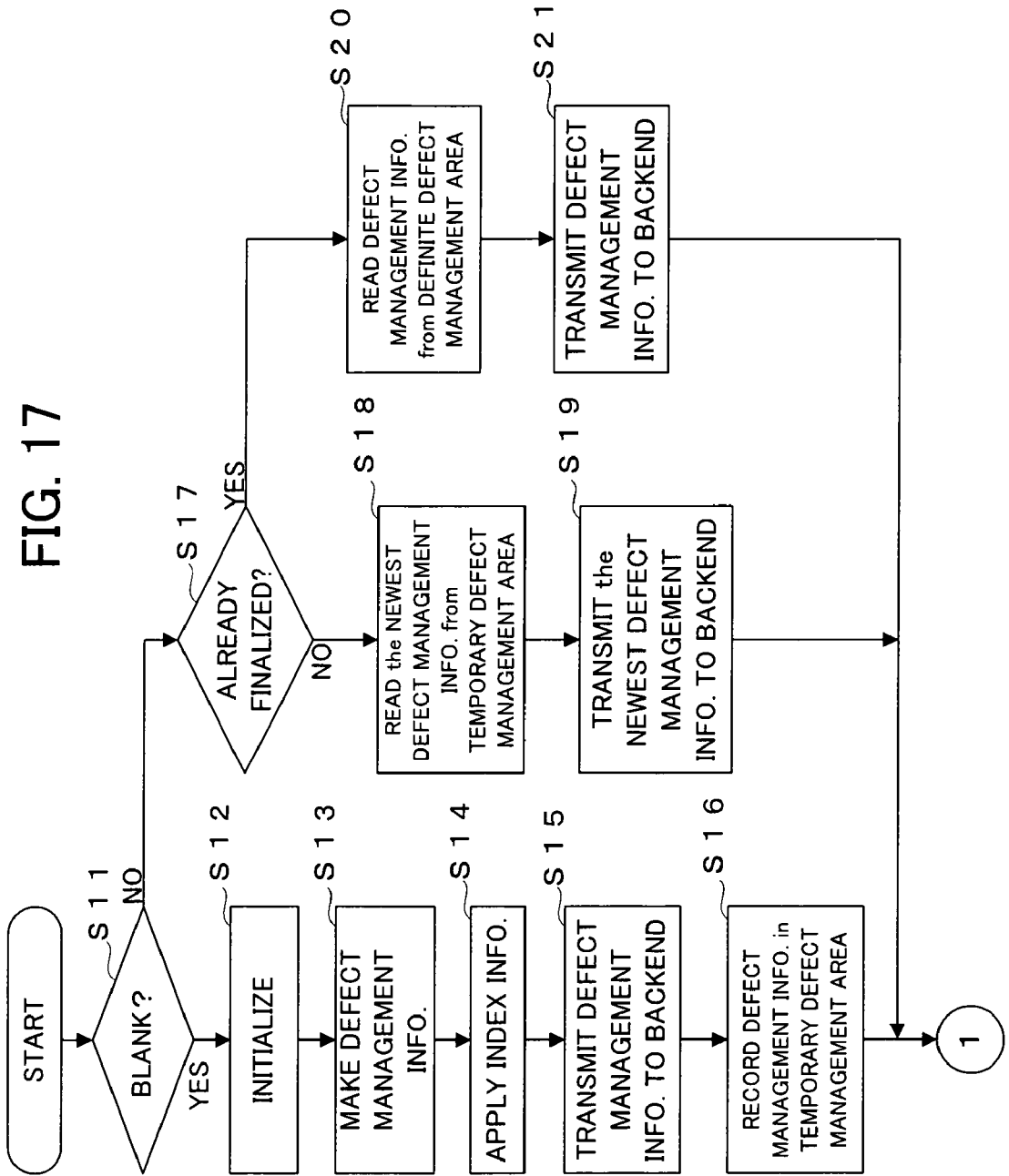
FIG. 17 is a flowchart showing an initial setting operation of the recording/reproducing apparatus in the example.

Next, an initial setting operation of the recording/reproducing apparatus 200 will be explained. FIG. 17 shows an initial setting operation of the recording/reproducing apparatus 200. The recording/reproducing apparatus 200 performs the initial setting between (i) when the optical disk 100 is inserted or loaded in the drive unit 300 and (ii) when the record data is recorded or reproduced. The initial setting is processing for preparing for the recording or reproducing of the record data and includes various processing. Out of the processing, the initialization of the optical disk 100, the generation of the defect management information 120, the transmission of the defect management information 120 to the backend 400, or the like will be explained below. The processing is performed mainly under the control of the CPU 361 of the drive unit 300.

As shown in FIG. 17, when the optical disk 100 is inserted or loaded into the drive unit 300, the CPU 361 of the drive unit 300 judges whether or not the optical disk 100 is an unrecorded disc i.e., a blank disk (step S11).

If the optical disk 100 is a blank disk (the step S11: YES), the CPU 361 initializes the optical disk 100 (step S12). In this initializing, the DMI generator 360 generates the defect management information 120 (step S13). Specifically, it obtains the start address and end address of the user data area 108 and the sizes of the spare areas 109 and 110, which are set in the initializing, and generates the setting information 121.

Moreover, the DMI generator 360 generates the defect list 122. The defect list 122 generated at this time has only an outline, not having any content. Namely, the defect address is not recorded in it, nor is the specific spare address. However, the defect list 122 is divided into the partial defect lists 122A to 122D, with each of the partial defect lists 122A to 122D corresponding to the partial spare areas 109A to 110B, respectively. In order to clarify this corresponding relationship, the start address of the corresponding partial spare area is recorded onto each of the partial defect lists as the management information (e.g. a header). The identifier for specifying its own partial defect list is also recorded onto each of the partial defect lists as the management information (e.g. a header). The empty area information for indicating the presence or absence of an empty area in the spare areas 109 and 110 as a whole is also recorded onto the partial defect list 122D as the management information (e.g. a header). At a stage of the initializing, the spare areas 109 and 110 are apparently all empty, so that the empty area information indicates "the presence of an empty area". The generated defect management information 120 is stored into and maintained in the DMI generator 360.

Then, the DMI generator 360 appended the index information 123 to the partial defect list 122D (step S14).

Then, the CPU 361 transmits the defect management information 120 stored in the DMI generator 360 to the backend 400 (step S15). The defect management information 120 is stored into the defect management device 477 of the backend 400.

Then, the CPU 361 records the defect management information 120 stored in the DMI generator 360 into the temporary defect management area 104 or 105 of the optical disk 100 (step S16).

On the other hand, if the optical disk 100 is not a blank disk (the step S11: NO), the CPU 361 judges whether or not the optical disk 100 is already finalized (step S17). The finalizing is processing for arranging a recording format so that the optical disk 100 can be reproduced by a reproducing apparatus for a general rewritable-type optical disk and a reproducing apparatus for a general optical disk of a reproduce only type. It is possible to recognize whether or not the optical disk 100 is already finalized by referring to the control information recorded in the lead-in area or the like.

If the optical disk 100 is not finalized yet (the step S17: NO), the CPU 361 reads the defect management information 120 from the temporary defect management area 104 or 105 of the optical disk 100 (step S18).

Now, the reading operation in the step S18 is explained. If the optical disk 100 is not a blank disk, the defect management information 120 generated upon initializing is recorded in the temporary defect management area 104 or 105. If the partial defect lists are already updated once or several times at a stage before the finalizing, one or several partial defect lists are already recorded in the temporary defect management area 104 or 105. The partial defect lists recorded by the updating are arranged successively in a row in the updated order in the temporary defect management area 104 or 105. Therefore, the partial defect list placed at the end in the temporary defect management area 104 or 105 is the newest partial defect list (refer to FIG. 3 or FIG. 4). The CPU 361 selects the partial defect list placed at the end.

In order to specify the partial defect list placed at the end (or the last partial defect list), the example adopts the following method. Namely, in the case where a plurality of partial defect lists are already recorded sequentially in a row in the temporary defect management area 104 or 105, information is recorded from the start address of the temporary defect management area 104 or 105 to the end address of the area in which the last partial defect list is recorded, and the subsequent area is unrecorded or blank. The CPU 361 controls the optical pickup 352 and scans the temporary defect management area 104 or 105, starting from the start address. Then, it detects a position from which a blank condition starts and scans backward the temporary defect management area 104 or 105 from the position. This is how to specify the last partial defect list.

Then, the CPU 361 refers to the index information 123 appended to the last partial defect list and refers to the identifiers included in this index information 123. It finds out the partial defect lists to which the identifiers are appended from the temporary defect management areas 104 and 105 and specifies the partial defect lists. Then, the CPU 361 reads the specified partial defect lists, the last partial defect list, and the setting information 121 from the temporary defect management area 104 or 105. The CPU 361 stores the read partial defect lists and the setting information 121 into the DMI generator 360.

The partial defect lists which are read by the above-described reading operation and which are recorded in the DMI generator 360 are the partial defect lists 122A to 122D constituting the newest one defect list 122. Namely, the newest one defect list 122 is stored by this reading operation in the DMI generator 360.

The CPU 361 transmits the defect list 122 and the setting information stored in the DMI generator 360 (i.e. the newest defect management information 120) to the backend 400 (step S19). The newest defect management information 120 is stored into the defect management device 477 of the backend 400.

On the other hand, if the optical disk 100 is not a blank disk but is already finalized (the step S17: YES), the CPU 361 reads the defect management information 120 from the definite defect management area 106 or 107 (step S20), stores this information into the DMI generator 360, and transmits this information to the backend 400 (step S21). The defect management information 120 is stored into the defect management device 477 of the backend 400.

As described above, the defect management information 120 is generated, or the newest defect management information 120 is read from the temporary defect management area 104 or 105, or is read from the definite defect management area 106 or 107. Then, it is recorded into the DMI generator 360 and is recorded into the defect management device 477 of the backend 400. This completes the preparation for the defect management and ends the initial setting.

Figure 18:
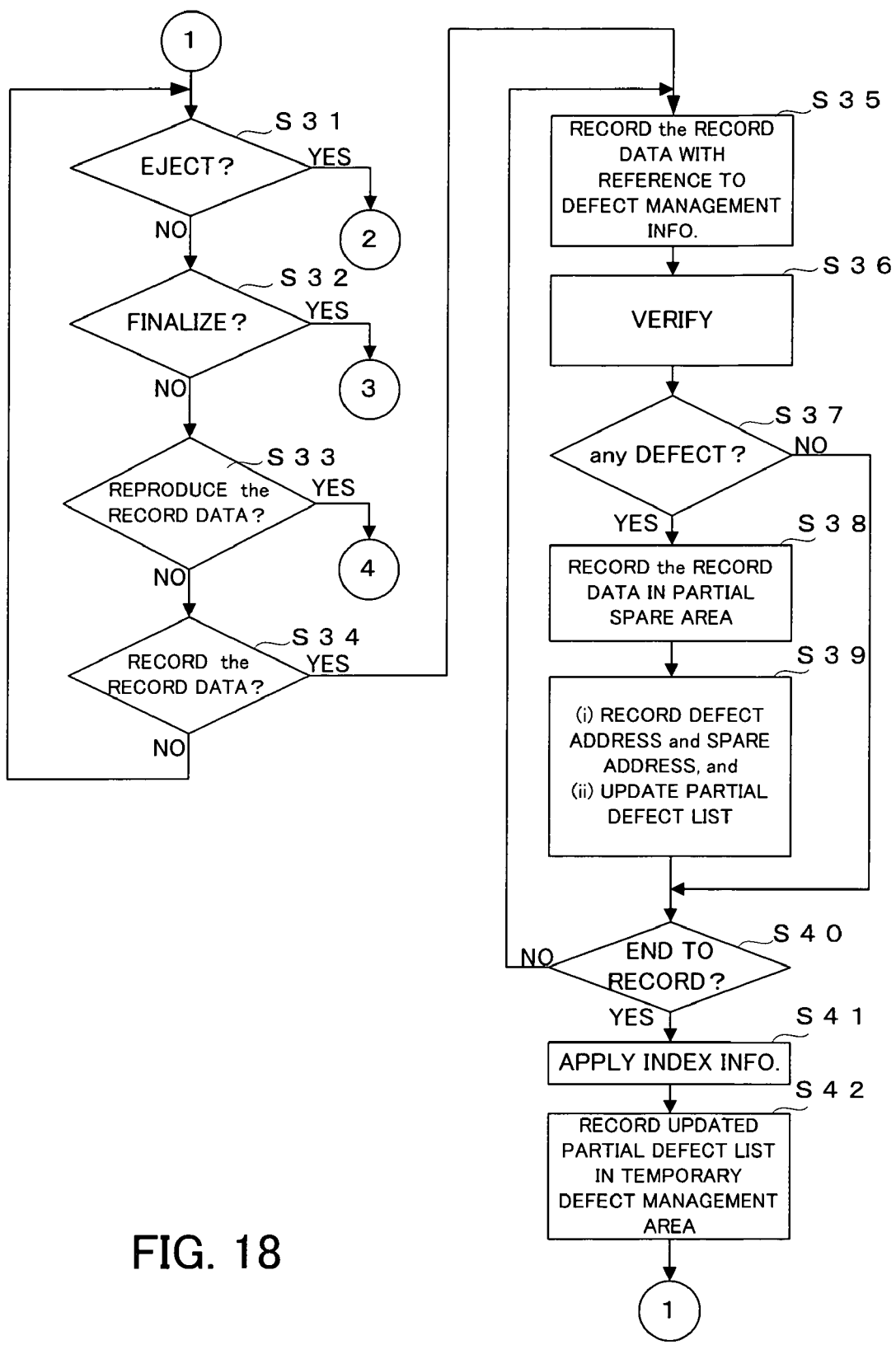
FIG. 18 is a flowchart showing operations including a recording operation of the recording/reproducing apparatus in the example.

Next, a recording operation of the recording/reproducing apparatus 200 will be explained. FIG. 18 mainly shows a recording operation of the recording/reproducing apparatus 200. The recording/reproducing apparatus 200 performs a recording operation of recording the record data into the user data area 108 on the optical disk 100. The recording/reproducing apparatus 200 performs the recording operation while performing the defect management. The recording/reproducing apparatus 200 performs verifying during the recording operation and updates any one of the partial defect lists 122A to 122D on the basis of the verifying. The recording operation is realized by the cooperation of the CPU 361 of the disk drive 300 and the system controller 476 of the backend 400.

As shown in FIG. 18, after judging whether or not an instruction of ejecting, finalizing or reproducing the record data from the optical disk 100 is given (steps S31, S32 and S33), when a user inputs an instruction of starting to record (step S34: YES), the recording/reproducing apparatus 200 responds to this and records the record data (step S35). The record data is recorded into each predetermined block. The recording/reproducing apparatus 200 refers to the defect management information stored in the defect management device 477 of the backend 400 and records the record data while performing the defect management on the basis of the information.

The recording/reproducing apparatus 200 performs verifying at each time of the one block recording (step S36), and updates any one of the partial defect lists 122A to 122D on the basis of the result of the verifying. Incidentally, the partial defect lists 122A to 122D which are updated are the partial defect lists stored in the DMI generator 360 of the disk drive 300. Specifically, when it is recognized, as a result of the verifying, that the record data fails to be recorded (step S37: YES), the CPU 361 of the disk drive 300 records the record data that fails to be recorded into any one of the partial spare areas 109A to 110B (step S38). Then, the CPU 361 records the defect address and the spare address onto the partial defect list corresponding to the partial spare area in which the record data is recorded, and updates the partial defect list (step S39).

When the above-described steps S35 to S39 end with respect to a series of blocks of the record data to be recorded this time, the CPU 361 appends the index information 123 to the updated partial defect list (step S41), and records the partial defect list and the index information 123 into the temporary defect management area 104 or 105 of the optical disk 100 (step S41). Incidentally, the partial defect list recorded in the temporary defect management area 104 or 105 is any one of the partial defect lists stored in the DMI generator 360. Then, the recording operation is completed.

Figure 19:
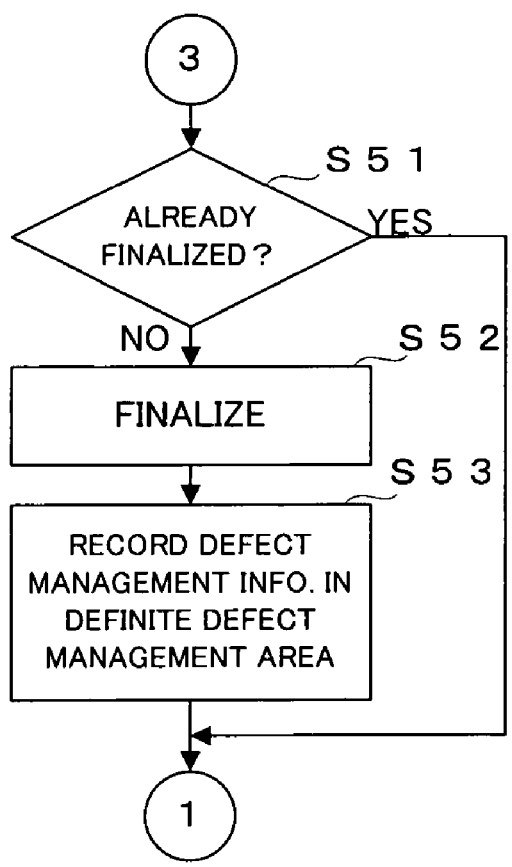
FIG. 19 is a flowchart showing a finalize operation of the recording/reproducing apparatus in the example.

Next, a finalize operation of the recording/reproducing apparatus 200 will be explained. FIG. 19 shows a finalize operation of the recording/reproducing apparatus 200. For example, when the user inputs an instruction for indicating to verify (the step S32 in FIG. 18: YES), as shown in FIG. 19, the recording/reproducing apparatus 200 confirms that the optical disk 100 is not finalized yet (step S51: NO) and finalizes the optical disk 100 (step S52). Upon finalizing, the recording/reproducing apparatus 200 records the defect management information 120 into the definite defect management area 106 or 107 on the optical disk 100 (step S53). Incidentally, the defect management information 120 recorded in the definite defect management area 106 or 107 is the defect management information stored in the DMI generator 360. Then, the finalizing is completed.

Figure 20:
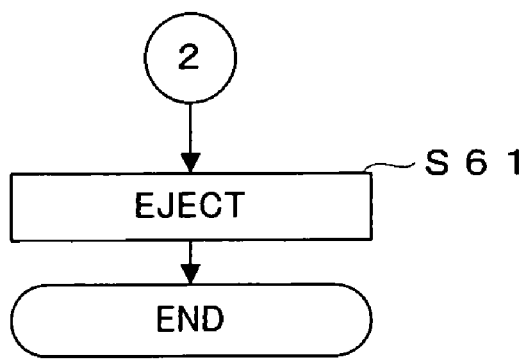
FIG. 20 is a flowchart showing an operation on ejecting of the recording/reproducing apparatus in the example.

Next, when the user inputs an instruction to eject the optical disk 100 from the recording/reproducing apparatus 200 (the step S31 in FIG. 18: YES), as shown in FIG. 20, the recording/reproducing apparatus 200 ejects the optical disk 100 immediately (step S61).

Figure 21:
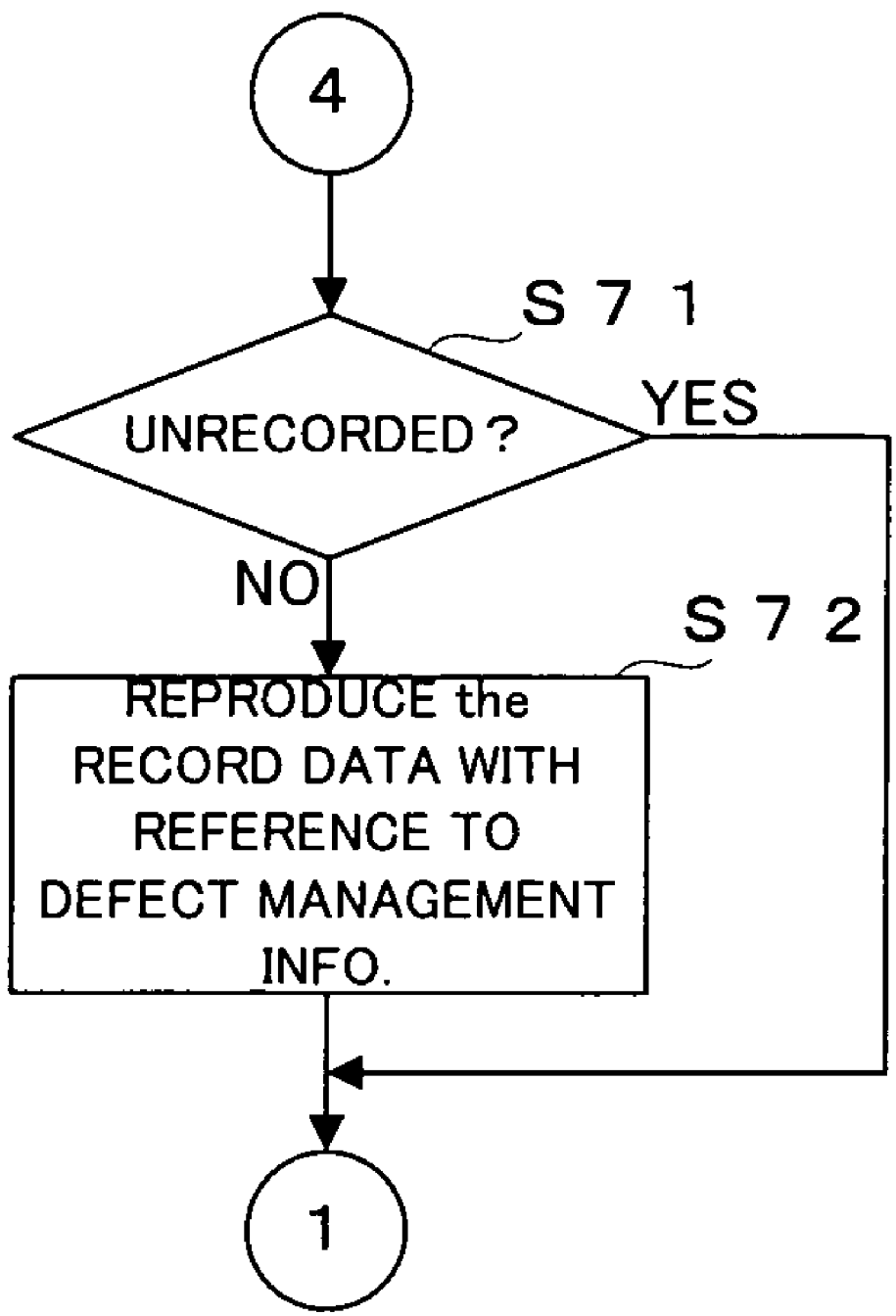
FIG. 21 is a flowchart showing a reproduction operation of the recording/reproducing apparatus in the example.

Next, a reproduction operation of the recording/reproducing apparatus 200 will be explained. FIG. 21 shows a reproduction operation of the recording/reproducing apparatus 200.

When the user inputs an instruction of starting to reproduce (the step S33 in FIG. 18: YES), as shown in FIG. 21, the recording/reproducing apparatus 200 confirms that the optical disk 100 is not a blank disc (the step S71: NO), and reproduces the record data recorded in the user data area 108 on the optical disk 100 (step S72). The recording/reproducing apparatus 200 reproduces the record data while performing the defect management on the basis of the defect management information 120 stored in the defect management device 477 of the backend 400.

As described above, according to the recording/reproducing apparatus 200, it records the defect management information 120 (the partial defect lists 122A to 122D) into the temporary defect management area 104 or 105 on the optical disk 100 before finalizing the optical disk 100, and it records the defect management information 120 into the definite defect management area 106 or 107 on the optical disk 100 when finalizing the optical disk 100. With respect to the optical disk 100 which is not finalized yet, the recording/reproducing apparatus 200 reads the defect management information 120 from the temporary defect management area 104 or 105 on the optical disk 100. With respect to the optical disk 100 which is already finalized, the recording/reproducing apparatus 200 reads the defect management information 120 from the definite defect management area 106 or 107 on the optical disk 100. This makes it possible to realize the recording or reproducing of record data while performing the appropriate defect management with respect to both the optical disk 100 which is not finalized yet and the optical disk 100 which is already finalized.

Specially, according to the recording/reproducing apparatus 200 in the example, only the updated partial defect list is recorded into the temporary defect management area 104 or 105 at a stage before the finalizing. Therefore, it is possible to reduce the amount of information recorded in the temporary defect management area 104 or 105.

Moreover, the index information 123 is appended to the partial defect list 122D generated upon the initialization and the updated partial defect list, and this index information 123 includes information for indicating the identifiers of the rest of the partial defect lists constituting the newest one defect list 122. Therefore, it is possible to easily specify and read only the partial defect lists constituting the newest one defect list 122 from among the plurality of the partial defect lists recorded in the temporary defect management area 104 or 105.

According to the recording/reproducing apparatus 200 in the example, it is constructed to record the defect management information 120 into the definite defect management area 106 or 107 on the optical disk 100 upon finalizing. Thus, it is possible to establish the compatibility between the write-once-type optical disk 100 and a general rewritable-type optical disk.

Figure 22:
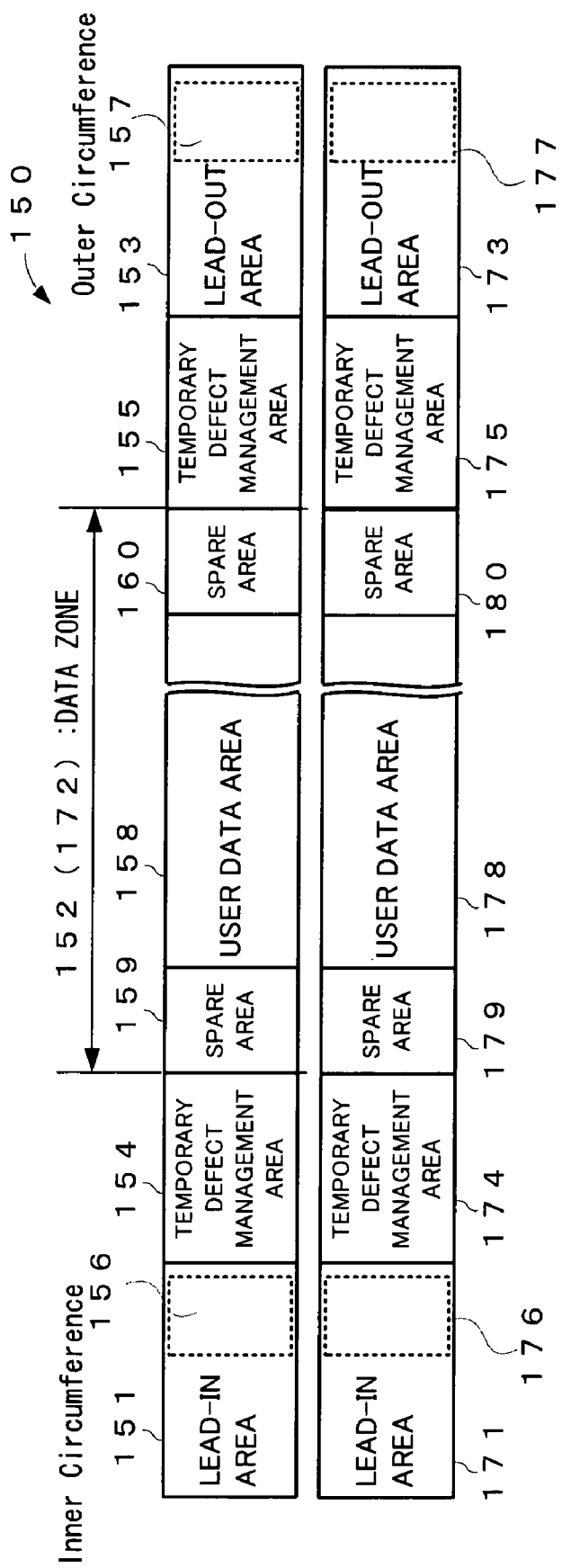
FIG. 22 is an explanatory diagram showing another example of the write-once-type recording medium of the present invention.

In the above-described example, the case where the write-once-type recording medium of the present invention is applied to a one-layer optical disk is taken as the example. The present invention, however, is not limited to this example and can be applied to a two or more layers optical disk. FIG. 22 shows another example in which the write-once-type recording medium of the present invention is applied to a two-layers optical disk 150. A first layer of the two-layers optical disk 150 in FIG. 22 (the upper part of FIG. 22) is provided with: a lead-in area 151; a data zone 152; and a lead-out area 153, as with the optical disk 100, with a temporary defect management area 154 placed between the lead-in area 151 and the data zone 152, and with a temporary defect management area 155 placed between the data zone 152 and the lead-out area 153. The lead-in area 151 and the lead-out area 153 are provided with definite defect management areas 156 and 157, respectively. The data zone 152 is provided with: a user data area 158; a spare area 159; and a spare area 160. A second layer is provided with: a lead-in area 171; a data zone 172; and a lead-out area 173, as with the optical disk 100, with a temporary defect management area 174 placed between the lead-in area 171 and the data zone 172, and with a temporary defect management area 175 placed between the data zone 172 and the lead-out area 173. The lead-in area 171 and the lead-out area 173 are provided with definite defect management areas 176 and 177, respectively. The data zone 172 is provided with: a user data area 178; a spare area 179; and a spare area 180.

The present invention can be changed if desired without departing from the scope or spirit of the invention which can be read from the claims and the entire specification. A write-once-type recording medium, a recording apparatus, a reproducing apparatus, a recording method, a reproducing method, and a computer program that realizes these functions, which accompany such changes, are also intended to be within the technical scope of the present invention.

INDUSTRIAL APPLICABILITY

A write-once-type recording medium, a recording apparatus and a recording method for the write-once-type recording medium, a reproducing apparatus and a reproducing method for the write-once-type recording medium, and a computer program that realizes these functions associated with the present invention can be applied to a high-density recording medium, such as an optical disk, a magnetic disk, and a magneto-optical disk, for example. Moreover, they can be applied to a recording medium, a recording/reproducing apparatus, or the like, which are mounted on or can be connected to various computer equipment, for example.

The invention claimed is:

1. A write-once-type recording medium comprising:
    a data area in which record data is recorded;
    a spare area in which the record data to be recorded or already recorded at a position of a defect in said data area is recorded; and
    a defect management area in which defect management information including a defect list is recorded, the defect list indicating (i) the position of the defect in said data area and (ii) a position in said spare area at which the record data to be recorded or already recorded at the position of the defect is recorded,
    said defect list being divided into a plurality of partial defect lists,
    index information able to be an index for specifying a partial defect list among the partial defect lists which carries newest information, being appended to at least one of the partial defect lists.

2. The write-once-type recording medium according to claim 1, wherein said one of the partial defect lists to which the newest index information is appended is placed at an end of the partial defect lists recorded successively in a row in said defect management area.

3. The write-once-type recording medium according to claim 1, wherein
    said spare area is divided into a plurality of partial spare areas, and
    the size of the partial defect list is at least large enough to record address information with the number corresponding to the number of blocks of the record data which can be recorded in said spare area.

4. The write-once-type recording medium according to claim 1, further comprising a control information recording area in which information for controlling an operation of recording and/or reading in said data area is recorded,
    said defect management area including (i) a temporary defect management area, which is placed between said control information recording area and said data area and in which the defect management information is temporarily recorded, and (ii) a definite defect management area, which is placed in said control information recording area and in which the defect management information is definitely recorded.

5. The write-once-type recording medium according to claim 1, wherein the defect management information further includes definition information for specifying positions of said data area and said spare area.

6. The write-once-type recording medium according to claim 1, wherein empty area information for indicating presence or absence of an empty area in said spare area is appended to a partial defect list placed at the end of the partial defect lists recorded successively in a row in said defect management area.

7. A recording apparatus for recording record data onto a write-once-type recording medium comprising: (I) a data area in which the record data is recorded; (II) a spare area in which the record data to be recorded or already recorded at a position of a defect in said data area is recorded; and (III) a defect management area in which defect management information including a defect list is recorded, the defect list indicating (i) the position of the defect in said data area and (ii) a position in said spare area at which the record data to be recorded or already recorded at the position of the defect is recorded, said defect list being divided into a plurality of partial defect lists, said recording apparatus comprising:
a first recording device for recording the record data into said data area;
a memory device for storing therein the defect management information;
a defect-detecting device for detecting a defect in said data area;
a second recording device for recording the record data to be recorded at the position in said data area of the defect detected by said defect-detecting device, into said spare area;
a list-updating device for updating the partial defect list by recording, onto the partial defect list, information for indicating (i) the position of the defect detected by said defect-detecting device and (ii) the position in said spare area at which the record data to be recorded at the position of the defect is recorded; and
a third recording device for (i) selecting the partial defect list updated by said list-updating device from among the plurality of partial defect lists included in the defect management information stored in said memory device and (ii) recording the selected partial defect list into said defect management area.

8. The recording apparatus according to claim 7, further comprising an index information appending device for appending index information able to be an index for specifying a partial defect list among the partial defect lists which carries newest information, to the partial defect list updated by said list-updating device,
said third recording device recording (i) the partial defect list updated by said list-updating device and (ii) the index information, into said defect management area.

9. The recording apparatus according to claim 8, further comprising a reading device for (i) specifying the plurality of partial defect lists included in the defect management information recorded in said defect management area on said write-once-type recording medium, on the basis of the index of the index information, (ii) reading the specified plurality of partial defect lists, (iii) connecting the read plurality of partial defect lists to thereby form one defect list, and (iv) storing the one defect list into said memory device.

10. A recording apparatus for recording record data onto a write-once-type recording medium comprising: (I) a data area in which the record data is recorded; (II) a spare area in which the record data to be recorded or already recorded at a position of a defect in said data area is recorded; (III) a temporary defect management area in which defect management information including a defect list is temporarily recorded, the defect list indicating (i) the position of the defect in said data area and (ii) a position in said spare area at which the record data to be recorded or already recorded at the position of the defect is recorded; and (IV) a definite defect management area in which the defect management information is definitely recorded, said defect list being divided into a plurality of partial defect lists, said recording apparatus comprising:
a first recording device for recording the record data into said data area;
a memory device for storing therein the defect management information;
a defect-detecting device for detecting a defect in said data area;
a second recording device for recording the record data to be recorded at the position in said data area of the defect detected by said defect-detecting device, into said spare area;
a list-updating device for updating the partial defect list by recording, onto the partial defect list, information for indicating (i) the position of the defect detected by said defect-detecting device and (ii) the position in said spare area at which the record data to be recorded at the position of the defect is recorded; and
a third recording device for (i) selecting the partial defect list updated by said list-updating device from among the plurality of partial defect lists included in the defect management information stored in said memory device and (ii) recording the selected partial defect list into said temporary defect management area.

11. The recording apparatus according to claim 10, further comprising an index information appending device for appending index information able to be an index for specifying a partial defect list among the partial defect lists which carries newest information, to the partial defect list updated by said list-updating device,
said third recording device recording (i) the partial defect list updated by said list-updating device and (ii) the index information, into said temporary defect management area.

12. The recording apparatus according to claim 11, further comprising a reading device for (i) specifying the plurality of partial defect lists included in the defect management information recorded in said temporary defect management area on said write-once-type recording medium, on the basis of the index of the index information, (ii) reading the specified plurality of partial defect lists, (iii) connecting the read plurality of partial defect lists to thereby form one defect list, and (iv) storing the one defect list into said memory device.

13. The recording apparatus according to claim 12, further comprising a fourth recording device for recording the one defect list stored in said memory device, into the definite defect management area.

14. The recording apparatus according to claim 13, further comprising a finalize-command device for giving a finalize-command for indicating to finalize said write-once-type recording medium,
said fourth recording device recording the one defect list into the definite defect management area in response to the finalize-command.

15. A recording method of recording record data on a write-once-type recording medium comprising: (I) a data area in which the record data is recorded; (II) a spare area in which the record data to be recorded or already recorded at a position of a defect in said data area is recorded; and (III) a defect management area in which defect management information including a defect list is recorded, the defect list indicating (i) the position of the defect in said data area and (ii) a position in said spare area at which the record data to be recorded or already recorded at the position of the defect is recorded, said defect list being divided into a plurality of partial defect lists, said recording method comprising:
a memory process of storing the defect management information;
a first recording process of recording the record data into said data area;

a defect-detecting process of detecting a defect in said data area;

a second recording process of recording the record data to be recorded at the position in said data area of the defect detected by said defect-detecting process, into said spare area;

a list-updating process of updating the partial defect list by recording, onto the partial defect list, information for indicating (i) the position of the defect detected by said defect-detecting process and (ii) the position in said spare area at which the record data to be recorded at the position of the defect is recorded; and a third recording process of (i) selecting the partial defect list updated by said list-updating process from among the plurality of partial defect lists included in the defect management information stored in said memory process and (ii) recording the selected partial defect list into said defect management area.

* * * * *